(12) United States Patent
Gorsuch et al.

(10) Patent No.: US 7,580,715 B2
(45) Date of Patent: Aug. 25, 2009

(54) DYNAMIC BANDWIDTH ALLOCATION TO TRANSMIT A WIRELESS PROTOCOL ACROSS A CODE DIVISION MULTIPLE ACCESS (CDMA) RADIO LINK

(75) Inventors: Thomas E. Gorsuch, Indialantic, FL (US); Carlo Amalfitano, Melbourne Beach, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 290 days.

(21) Appl. No.: 10/776,558

(22) Filed: Feb. 11, 2004

(65) Prior Publication Data

US 2004/0160982 A1   Aug. 19, 2004

Related U.S. Application Data

(63) Continuation of application No. 10/345,791, filed on Jan. 16, 2003, now abandoned, which is a continuation of application No. 09/596,425, filed on Jun. 19, 2000, now Pat. No. 6,526,281, which is a continuation of application No. 08/992,760, filed on Dec. 17, 1997, now Pat. No. 6,081,536.

(60) Provisional application No. 60/050,277, filed on Jun. 20, 1997, provisional application No. 60/050,338, filed on Jun. 20, 1997.

(51) Int. Cl.
   *H04Q 7/20* (2006.01)
(52) U.S. Cl. ............... 455/452.1; 455/450; 455/509; 370/468; 370/335; 370/342; 370/465

(58) Field of Classification Search .............. 455/452.1, 455/452.2, 457.2, 500, 450, 509; 370/468, 370/335, 342, 465
See application file for complete search history.

(56) References Cited

U.S. PATENT DOCUMENTS 4,107,469 A    8/1978   Jenkins
4,577,316 A    3/1986   Schiff (Continued)

FOREIGN PATENT DOCUMENTS

DE    4426183    10/1995

(Continued)

OTHER PUBLICATIONS

Chih-Lin I et al., Multi-Code CDMA Wireless Personal Communications Networks, Jun. 18, 1005.

(Continued)

*Primary Examiner*—Charles N Appiah
*Assistant Examiner*—Joy K Contee
(74) *Attorney, Agent, or Firm*—Volpe and Koenig, P.C.

(57) ABSTRACT

A code division multiple access (CDMA) user device includes a CDMA transceiver, and a controller connected to the CDMA transceiver for establishing a communication session with a base station. The communication session includes a plurality of layers including a physical layer. The controller negotiates with the base station for an allocated bandwidth for the CDMA transceiver. The controller also establishes and releases a physical layer connection between the CDMA transceiver and the base station, and maintains a state of at least one other layer during the communication session after termination of the physical layer.

71 Claims, 7 Drawing Sheets

U.S. PATENT DOCUMENTS

| | | | |
|---|---|---|---|
| 4,625,308 A | 11/1986 | Kim et al. | |
| 4,675,863 A | 6/1987 | Paneth et al. | 370/50 |
| 4,817,089 A | 3/1989 | Paneth et al. | 370/95 |
| 4,841,526 A | 6/1989 | Wilson et al. | |
| 4,862,453 A | 8/1989 | West et al. | |
| 4,866,709 A | 9/1989 | West et al. | |
| 4,912,705 A | 3/1990 | Paneth et al. | 370/95.1 |
| 4,949,395 A | 8/1990 | Rydbeck | 455/33 |
| 5,022,024 A | 6/1991 | Paneth et al. | 370/50 |
| 5,027,348 A | 6/1991 | Curry | |
| 5,027,400 A | 6/1991 | Baji et al. | 380/20 |
| 5,114,375 A | 5/1992 | Wellhausen et al. | 446/246 |
| 5,115,309 A | 5/1992 | Hang | |
| 5,226,044 A | 7/1993 | Gupta et al. | 370/81 |
| 5,268,900 A | 12/1993 | Hluchyj et al. | |
| 5,282,222 A | 1/1994 | Fattouche et al. | 375/1 |
| 5,325,419 A | 6/1994 | Connolly et al. | 379/60 |
| 5,355,374 A | 10/1994 | Hester et al. | 370/84 |
| 5,369,637 A | 11/1994 | Richardson et al. | |
| 5,373,502 A | 12/1994 | Turban | 370/18 |
| 5,375,124 A | 12/1994 | D'Ambrogio et al. | |
| 5,388,102 A | 2/1995 | Griffith et al. | |
| 5,394,473 A | 2/1995 | Davidson | |
| 5,412,429 A | 5/1995 | Glover | 348/398 |
| 5,442,625 A | 8/1995 | Gitlin et al. | 370/18 |
| 5,463,629 A | 10/1995 | Ko | |
| 5,471,463 A | 11/1995 | Hulbert | 370/335 |
| 5,585,850 A | 12/1996 | Schwaller | 348/388 |
| 5,586,113 A | 12/1996 | Adachi et al. | |
| 5,592,470 A | 1/1997 | Rudrapatna et al. | 370/468 |
| 5,592,471 A | 1/1997 | Briskman | 455/506 |
| 5,594,782 A | 1/1997 | Zicker et al. | |
| 5,603,081 A | 2/1997 | Raith et al. | |
| 5,606,580 A | 2/1997 | Mourot et al. | |
| 5,617,423 A | 4/1997 | Li et al. | 370/426 |
| 5,642,348 A | 6/1997 | Barzegar et al. | 370/277 |
| 5,655,001 A | 8/1997 | Cline et al. | 370/328 |
| 5,657,358 A | 8/1997 | Panech et al. | 375/356 |
| 5,663,958 A | 9/1997 | Ward | |
| 5,663,990 A | 9/1997 | Bolgiano et al. | 375/347 |
| 5,673,259 A | 9/1997 | Quick, Jr. | 370/342 |
| 5,687,194 A | 11/1997 | Paneth et al. | 375/283 |
| 5,697,059 A | 12/1997 | Carney | 455/34.1 |
| 5,699,364 A | 12/1997 | Sato et al. | |
| 5,734,646 A | 3/1998 | I et al. | 370/335 |
| 5,781,542 A | 7/1998 | Tanaka et al. | |
| 5,784,406 A | 7/1998 | DeJaco et al. | 375/224 |
| 5,790,551 A | 8/1998 | Chan | 370/458 |
| 5,793,744 A | 8/1998 | Kanerva et al. | 370/209 |
| 5,796,744 A | 8/1998 | Krawczak et al. | |
| 5,802,465 A | 9/1998 | Hamalainen et al. | |
| 5,825,807 A | 10/1998 | Kumar | |
| 5,828,659 A | 10/1998 | Teder et al. | 370/328 |
| 5,828,662 A | 10/1998 | Jalali et al. | 370/335 |
| 5,844,894 A | 12/1998 | Dent | 370/330 |
| 5,845,211 A | 12/1998 | Roach | |
| 5,854,786 A | 12/1998 | Henderson et al. | |
| 5,856,971 A | 1/1999 | Gitlin et al. | 370/335 |
| 5,859,840 A | 1/1999 | Tiedemann, Jr. et al. | 370/335 |
| 5,859,879 A | 1/1999 | Bolgiano et al. | |
| 5,872,786 A | 2/1999 | Shobatake | 370/398 |
| 5,881,060 A | 3/1999 | Morrow et al. | 370/337 |
| 5,896,376 A | 4/1999 | Alperovich et al. | 370/347 |
| 5,910,945 A | 6/1999 | Garrison et al. | 370/324 |
| 5,914,950 A | 6/1999 | Tiedemann, Jr. et al. | 370/348 |
| 5,923,650 A | 7/1999 | Chen et al. | 370/331 |
| 5,930,230 A | 7/1999 | Odenwalder et al. | 370/208 |
| 5,950,131 A | 9/1999 | Vilmur | 455/434 |
| 5,956,332 A | 9/1999 | Rasanen et al. | 370/342 |
| 5,966,374 A | 10/1999 | Rasanen | 370/337 |
| 5,991,279 A | 11/1999 | Haugli et al. | |
| 6,001,800 A | 12/1999 | Mehla et al. | |
| 6,002,690 A | 12/1999 | Takayama et al. | 370/437 |
| 6,005,855 A | 12/1999 | Zehavi et al. | 370/335 |
| 6,009,106 A | 12/1999 | Rustad et al. | |
| 6,011,800 A | 1/2000 | Nadgauda et al. | 370/437 |
| 6,028,853 A * | 2/2000 | Haartsen | 370/338 |
| 6,028,868 A | 2/2000 | Yeung et al. | 370/515 |
| 6,052,385 A | 4/2000 | Kanerva et al. | |
| 6,064,678 A | 5/2000 | Sindhushayana et al. | 370/470 |
| 6,069,883 A | 5/2000 | Ejzak et al. | 370/335 |
| 6,078,572 A | 6/2000 | Tanno et al. | 370/335 |
| 6,081,536 A | 6/2000 | Gorsuch et al. | 370/468 |
| 6,088,335 A | 7/2000 | I et al. | 370/252 |
| 6,097,733 A | 8/2000 | Basu et al. | |
| 6,111,863 A | 8/2000 | Rostoker et al. | |
| 6,112,092 A | 8/2000 | Benveniste | 455/450 |
| 6,134,233 A | 10/2000 | Kay | 370/350 |
| 6,151,332 A | 11/2000 | Gorsuch et al. | |
| 6,157,619 A | 12/2000 | Ozluturk et al. | 370/252 |
| 6,161,013 A | 12/2000 | Anderson et al. | 455/435 |
| 6,195,362 B1 | 2/2001 | Darcie et al. | 370/431 |
| 6,196,362 B1 | 3/2001 | Daugherty, Jr. et al. | |
| 6,198,723 B1 | 3/2001 | Parruck et al. | |
| 6,208,871 B1 | 3/2001 | Hall et al. | 455/517 |
| 6,215,798 B1 | 4/2001 | Carneheim et al. | 370/515 |
| 6,222,828 B1 | 4/2001 | Ohlson et al. | 370/320 |
| 6,236,647 B1 | 5/2001 | Amalfitano | |
| 6,243,372 B1 | 6/2001 | Petch et al. | 370/350 |
| 6,259,683 B1 | 7/2001 | Sekine et al. | 370/328 |
| 6,262,980 B1 | 7/2001 | Leung et al. | 370/336 |
| 6,269,088 B1 | 7/2001 | Masui et al. | 370/335 |
| 6,272,168 B1 | 8/2001 | Lomp et al. | 375/206 |
| 6,285,665 B1 | 9/2001 | Chuah | 370/319 |
| 6,307,840 B1 | 10/2001 | Wheatley, III et al. | 370/252 |
| 6,310,859 B1 | 10/2001 | Morita et al. | 370/235 |
| 6,366,570 B1 | 4/2002 | Bhagalia | 370/342 |
| 6,370,117 B1 | 4/2002 | Koraitim et al. | |
| 6,373,830 B1 | 4/2002 | Ozluturk | 370/335 |
| 6,373,834 B1 | 4/2002 | Lundh et al. | 370/350 |
| 6,377,548 B1 | 4/2002 | Chuah | 370/233 |
| 6,377,809 B1 | 4/2002 | Rezaiifar et al. | 455/455 |
| 6,388,999 B1 | 5/2002 | Gorsuch et al. | |
| 6,389,000 B1 | 5/2002 | Jou | 370/342 |
| 6,396,804 B2 | 5/2002 | Odenwalder | 370/209 |
| 6,418,148 B1 | 7/2002 | Kumar et al. | 370/468 |
| 6,456,608 B1 | 9/2002 | Lomp | 370/335 |
| 6,469,991 B1 | 10/2002 | Chuah | 370/329 |
| 6,473,623 B1 | 10/2002 | Benveniste | 455/522 |
| 6,504,830 B1 | 1/2003 | Östberg et al. | 370/342 |
| 6,519,651 B1 | 2/2003 | Dillon | 709/250 |
| 6,526,039 B1 | 2/2003 | Dahlman et al. | 370/350 |
| 6,526,064 B1 | 2/2003 | Bousquet | |
| 6,526,281 B1 | 2/2003 | Gorsuch et al. | 455/452 |
| 6,532,365 B1 | 3/2003 | Anderson et al. | 455/437 |
| 6,542,481 B2 | 4/2003 | Foore et al. | |
| 6,545,986 B1 | 4/2003 | Stellakis | 370/318 |
| 6,567,416 B1 | 5/2003 | Chuah | 370/418 |
| 6,570,865 B2 | 5/2003 | Masui et al. | 370/342 |
| 6,571,296 B1 | 5/2003 | Dillon | 709/250 |
| 6,574,211 B2 | 6/2003 | Padovani et al. | 370/347 |
| 6,597,913 B2 | 7/2003 | Natarajan | 455/452 |
| 6,845,104 B2 | 1/2005 | Johnson et al. | |
| 6,973,140 B2 | 12/2005 | Hoffman et al. | |
| 2004/0160910 A1 | 8/2004 | Gorsuch et al. | |
| 2004/0180696 A1 * | 9/2004 | Foore et al. | 455/561 |

FOREIGN PATENT DOCUMENTS

| | | |
|---|---|---|
| EP | 443061 | 8/1991 |
| EP | 526106 | 2/1993 |
| EP | 0526106 | 2/1993 |
| EP | 635949 | 1/1995 |
| EP | 0682423 | 11/1995 |

| | | |
|---|---|---|
| EP | 682423 | 11/1995 |
| EP | 0682426 | 11/1995 |
| EP | 682426 | 11/1995 |
| EP | 0719062 | 6/1996 |
| EP | 719062 | 6/1996 |
| FR | 2761557 | 1/1998 |
| JP | 9-55764 | 2/1997 |
| JP | 2000-236343 | 8/2000 |
| JP | 2000-286851 | 10/2000 |
| JP | 2002-51044 | 4/2002 |
| JP | 2002-51044 | 5/2002 |
| SU | 1401626 | 6/1988 |
| SU | 1837403 | 8/1993 |
| WO | 95/07578 | 3/1995 |
| WO | 95/08900 | 3/1995 |
| WO | 96/08934 | 3/1996 |
| WO | 96/37081 | 11/1996 |
| WO | 96/27994 | 12/1996 |
| WO | 97/32412 | 4/1997 |
| WO | 97/23073 | 6/1997 |
| WO | 97/46044 | 12/1997 |
| WO | 98/59447 | 12/1998 |
| WO | 98/59523 | 12/1998 |
| WO | 99/44341 | 9/1999 |
| WO | 99/63713 | 12/1999 |
| WO | 9963713 | 12/1999 |

OTHER PUBLICATIONS

Chih-Lin I et al., IS-95 Enhancements for Multimedia Services, Bell Labs Technical Journal, pp. 60-87, Autumn 1996, no month listed.
Chih-Lin I et al., Performance of Multi-Code CDMA Wireless Personal Communications Networks, Jul. 25, 1995.
Liu et al., Channel Access and Interference Issues in Multi-Code DS CDMA Wireless Packet (ATM) Networks, Wireless Networks 2, pp. 173-196, 1996, no month listed.
Chih-Lin I et al., Load and Interference Based demand Assignment (LIDA) for Integrated Services in CDMA Wireless Systems, Nov. 18, 1996, pp. 235-241.
Budka et al., Cellular Digital Packet Data Networks, Bell Labs Technical Journal, Summer 1997, pp. 164-181, no month liste.
Cellular Digital Packet Data, System Specification, Release 1.1, Jan. 19, 1995.
Data Standard, Packet DATA Section, PN-3676.5 (to be published as TIA/EIA/IS-Data.5), Dec. 8, 1996, Version 02 (Content Revision 03).
Data Service Options for Wideband Spread Spectrum Systems: Introduction, PN-3676.1 (to be published as TIA/EIA/IS-707.1), Mar. 20, 1997 (Content Revision 1).
Packet Data Service Option Standard for Wideband Spread Spectrum Systems, TIA/EIA Interim Standard, TIA/EIA/IS-657, Jul. 1996.
Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Mobile Station-Base Station Compatibility Standard for Wideband Spread Spectrum Cellular Systems, TIA/EIA Standard, TIA/EIA/IS-95-B (Upgrade and Revision of TIA/EIA-95-A), Mar. 1995.
Network Wireless Systems Offer Business Unit (NWS OBU), Feature Definition Document for Code Division Multiple Access (CDMA) Packet Mode Data Services, FDD-1444, Nov. 26, 1996.
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998), no date listed.
Draft Text for "★95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf), no date listed.
Reed et al., Iterative Multiuser Detection for CDMA with FEC: Near-Single-User Performance, IEEE Transactions on Communications, vol. 46, No. 12, Dec. 1998, pp. 1693-1699.
Hindelang et al., Using Powerful "Turbo" Codes for 14.4 Kbits/s Data Service in GSM or PCS Systems, IEEE Global Communications Conference, Phoenix, Arizona, USA, Nov. 3-8, 1997, vol. II, pp. 649-653.
Kaiser et al., Multi-Carrier CDMA with Iterative Decoding and Soft-Interference Cancellation, Proceedings of Globecom 1997, vol. 1, pp. 523-529, no month listed.
Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.
Hall et al., Design and Analysis of Turbo Codes on Rayleigh Fading Channels, IEEE Journal on Selected Areas in Communications, vol. 16, No. 2, Feb. 1998, pp. 160-174.
High Data Rate (HDR) Solution, Qualcomm, Dec. 1998.
Azad et al., Multirate Spread Spectrum Direct Sequence CDMA Techniques, 1994, The Institute of Electrical Engineers, no month listed.
Ejzak et al., Lucent Technologies Air Interface Proposal for CDMA High Speed Data Service, Revision 0.1, May 5, 1997.
Knisely, Lucent Technologies Air Interface Proposal for CDMA High Speed Data Service, Jan. 16, 1997.
Kumar et al, An Access Scheme for High Speed Packet Data Service on IS-95 based CDMA, Feb. 11, 1997.
Ejzak et al., Lucent Technologies Air Interface Proposal for CDMA High Speed Data Service, Apr. 14, 1997.
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Chih-Lin I et al., Variable Spreading Gain CDMA with Adaptive Control for True Packet Switching Wireless Network, 1995, pp. 725-730, no month listed.
Skinner et al., Performance of Reverse-Link Packet Transmission in Mobile Cellular CDMA Networks, IEEE, 2001, pp. 1019-1023, no month listed.
Lau et al., A Channel-State-Dependent Bandwidth Allocation scheme for Integrated Isochronous and Bursty Media Data in a Cellular Mobile Information System, IEEE, 2000, pp. 524-528, no month listed.
Elhakeem, Congestion Control in Signaling Free Hybrid ATM/CDMA Satellite Network, IEEE, 1995, pp. 783-787, no month listed.
Chung, Packet Synchronization and Identification for Incremental Redundancy Transmission in FH-CDMA Systems, 1992, IEEE, pp. 292-295, no month listed.
High Data Rate (HDR), cdmaOne optimized for high speed, high capacity data, Wireless Infrastructure, Qualcomm, Sep. 1998.
Viterbi, The Path to Next Generation Services with CDMA, Qualcomm Incorporated, 1998 CDMA Americas Congress, Los Angeles, California, Nov. 19, 1998.
Melanchuk et al., *CDPD and Emerging Digital Cellular Systems*, Digest of Papers of COMPCON, Computer Society Conference 1996, Santa Clara, CA, No. CONF. 41, Feb. 25, 1996, pp. 2-8, XP000628458.
Puleston, PPP Protocol Spoofing Control Protocol, Global Village Communication (UK) Ltd., Feb. 1996.
Simpson, W. (Editor). "RFC 1661—The Point-to-Point Protocol (PPP)." Network Working Group, Jul. 1994, pp. 1-35. http://www.faqs.org/rfcs/rfc1661.html.
Simpson, W. (Editor). "RFC 1662—PPP in HDLC-Like Framing." Network Working Group, Jul. 1994, pp. 1-17. http://www.faqs.org/rfcs/rtc1662.html.
Chih-Lin I et al., Multi-Code CDMA Wireless Personal Communications Networks, Jun. 18, 1005.
Chih-Lin I et al., IS-95 Enhancements for Multimedia Services, Bell Labs Technical Journal, pp. 60-87, Autumn 1996.
Chih-Lin I et al., Performance of Multi-Code CDMA Wireless Personal Communications Networks, Jul. 25, 1995.

Liu et al., Channel Access and Interference Issues in Multi-Code DS-CDMA Wireless Packet (ATM) Networks, Wireless Networks 2, pp. 173-196, 1996.

Chih-Lin I et al., Load and Interference Based Demand Assignment (LIDA) for Integrated Services in CDMA Wireless Systems, Nov. 18, 1996, pp. 235-241.

Lau et al., A Channel-State-Dependent Bandwidth Allocation scheme for Integrated Isochronous and Bursty Media Data in a Cellular Mobile Information System, IEEE, 2000, pp. 524-528.

Elhakeem, Congestion Control in Signalling Free Hybrid ATM/CDMA Satellite Network, IEEE, 1995, pp. 783-787.

Chung, Packet Synchronization and Identification for Incremental Redundancy Transmission in FH-CDMA Systems, 1992, IEEE, pp. 292-295.

High Data Rate (HDR), cdmaOne optimized for high speed, high capacity data, Wireless Infrastructure, Qualcomm, Sep. 1998.

Viterbi, The Path to Next Generation Services with CDMA, Qualcomm Incorporated, 1998 CDMA Americas Congress, Los Angeles, California, Nov. 19, 1998.

Melanchuk et al. *COPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Bell Labs Technical Journal, Lucent Technologies, vol. 2, No. 3, Summer 1997.

Puleston, PPP Protocol Spoofing Control Protocol, Global Village Communication (UK) Ltd., Feb. 1996.

Simpson, W. (Editor). "RFC 1661—The Point-to-Point Protocol (PPP)." Network Working Group, Jul. 1994, pp. 1-35. http://www.faqs.org/rfcs/rfc1661/html.

Simpson, W. (Editor). "RFC 1662—PPP in HDLC-Like Framing." Network Working Group, Jul. 1994, pp. 1-17, http://www.faqs.org/rfcs/rfc1662/html.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*MSC-BS Interface for Public 800 MHz.* TIA/EIA/IS-634. TIA/EIA Interim Standard, Dec. 1995.

*MSC-BS Interface (A-Interface) for Public 800 MHz.* TIA/EIA/IS-634-A. TIA/EIA Interim Standard (Revision of TIA/EIA/IS-634) Jul. 1998.

Honkasalo, Harri. *High Speed Data Air Interface.* 1996.

*Data Services Option Standard for Wideband Spread Spectrum Digital Cellular System*, TIA/EIA/IS-99. TIA/EIA Interim Standard. Jul. 1995.

Knisely, Douglas, N. Telecommunications Industry Association Subcommittee TR-45.5—*Wideband Spread Spectrum Digital Technologies Standards.* Banff, Alberta. Feb. 24, 1997 (TR45.5/97.02.24)21.

Ott, David TR45.5, CDMA WBSS Technical Standards Meeting Summary. Feb. 24-28, 1997 Banff, Alberta.

Knisely, Douglas, N. Telecommunications Industry Association Subcommittee TR-45.5—*Wideband Spread Spectrum Digital TechnologiesStandards, Working Group III—Physical Layer*, Banff, Alberta. Feb. 24, 1997 (TR45.5/97.02.24)22.

Ejzak, et al. *Proposal for High Speed Packet Data Service, Version 0.1.* Lucent Technologies, Jan. 16, 1997.

Attachment 2, *High Speed Data RLP* Lucent Technologies, Version 0.1, Jan. 16, 1997.

*Data Services Options Standard for Wideband Spread Spectrum Systems: Packet Data Services. PN-3676.5 (to be published as TIA/EIA/IS-707.5) Ballot Version*, May 30, 1997.

Telecommunications Industry Association Meeting Summary. Task Group I, Working Group III, Subcommittee TR45.5, Feb. 24-27, 1997. Banff, Alberta.

WWW.CDG.ORG/NEWS/PRESS/1997.ASP. CDA Press Release Archive, 1997.

*Physical Layer Standard for cdma2000 Spread Spectrum Systems, Release C.* TIA/EIA Interim Standard. TIA/EIA/IS-2000.2C. May, 2002.

*Data Service Options for Wideband Spread Spectrum Systems.* TIA/EIA Interim Standard. TIA/EIA/IS-707-A, Apr. 1999.

*Upper Layer (Layer 3) Signaling Standard for cdma2000 Spread Spectrum Systems, Release C.* TIA/EIA Interim Standard. TIA/EIA/IS-2000.5-C. May, 2002.

*Introduction to cdma2000 Spread Spectrum Systems, Release C.* TIA/EIA Interim Standard. TIA/EIA/IS-2000.1-C. May, 2002.

Motorola, Version 1.0. *Motorola High Speed Data Air Interface Proposal Comparisions and Recommendations.* Jan. 27, 1997.

*Telecommunications Industry Association Meeting Summary.* Task Group I, Working Group III, Subcommittee TR45.5. Jan. 6-8, 1997. Newport Beach, California. (Tiedemann, pp. 4-8).

Schacham, et al., "A Selective-Repeat-ARQ Protocol for Parallel Channels and its Resequencing Analysis," IEEE Transactions On Communications, XP000297814, 40 (4): 773-782 (Apr. 1997).

Wang et al., The Performance of Turbo-Codes in Asynchronous DS-CDMA, IEE Global Communications Conferernce, Phoenix, Arizona, USA, Nov. 3-8, 1007, Gol: III, pp. 1548-1551.

Hall et al., Design and Analysis of Turbo Codes on Rayleigh Fading Channels, IEEE Journal on Selected Areas in Communications, vol. 16, No. 2, Feb. 1996. pp. 160-174.

High Data Rate (HDR) Solution, Qualcomm, Dec. 1998.

Azad et al., Multirate Spread Spectrum Direct Sequence CDMA Techniques, 1994, The Institute of Electrical Engineers.

Ejzak et al., Lucent Technologies Air Interface Proposal for CDMA High Speed Data Service, Revision 0.1, May 5, 1997.

Knisely, Lucent Technologies Air Interface Proposal for CDMA High Speed Data Service, Jan. 16, 1997.

Kumar et al, An Access Scheme for High Speed Packet Data Service on IS-95 based CDMA, Feb. 11, 1997.

Ejzak et al., Lucent Technologies Air Interface Proposal for CDMA High Speed Data Service, Apr. 14, 1997.

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Krymien et al., Rapid Acquisition Algorithms for Synchronization of Bursly Transmissions in CDMA Microcellular and Personal Wireless Systems, IEEE Journal on Selected Areas in Communications, vol. 14, No. 3 Apr. 1996, pp. 570-579.

Chih-Lin I et al., Variable Spreading Gain CDMA with Adaptive Control for True Packet Switching Wireless Network, 1995, pp. 725-730.

Skinner et al., Performance of Reverse-Link Packet Transmission in Mobile Cellular CDMA Networks, IEEE, 2001, pp. 1019-1023.

Chih-Lin I et al., Multi-Code CDMA Wireless Personal Communications Networks, Jun. 18, 1005.

Chih-Lin I et al., IS-95 Enhancements for Multimedia Services, Bell Labs Technical Journal, pp. 60-87, Autumn 1996.

Chih-Lin I et al., Performance of MultiCode CDMA Wireless Personal Communications Networks, Jul. 25, 1995.

Liu et al., Channel Access and Interference Issues in Multi-Code DS-CDMA Wireless Packet (ATM) Networks, Wireless Networks 2, pp. 173-196, 1996.

Chih-Lin I et al., Load and Interference Based Demand Assignment (LIDA) for Integrated Services in CDMA Wireless Systems, Nov. 18, 1996, pp. 235-241.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Data Standard, Packet Data Section, PN-3676.5 (to be published as TIA/EIA/IS-DATA.5), Dec. 8, 1996, Version 02 (Content Revision 03).

Data Service Options for Wideband Spread spectrum Systems: Introduction, PN-3676.1 (to be published as TIA/EIA/IS-707.1), Mar. 20, 1997 (Content Revision 1).

Packet Data Service Option Standard for Wideband Spread Spectrum Systems, TIA/EIA Interim Standard, TIA/EIA/IS-657, Jul. 1996.

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibilty Standard for Wideband Spread Spectrum Cellular Systems, TIA/EIA Standard, TIA/EIA-95-B (Upgrade and Revision of TIS/EIA-95-A), Mar. 1999.

Network Wireless Systems Offer Business Unit (NWS OBU), Feature Definition Document for Code Division Multiple Access (CDMA) Packet Mode Data Services, FDD-144, Nov. 26, 1996.

Draft Text for "95C" Physical Layer (Recision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Draft Text for "95C" Physical Layer (Revision 4), Part 1 Document #531-981-20814-95C, Part 1 on 3GPP2 website (ftp://ftp.3gpp2.org/tsgc/working/1988/1298_Maui/WG3-TG1/531-98120814-95c,%20part%201.pdf).

Reed et al., Iterative Multiuser Detection for CDMA with FEC: Near-Single-User Performance, IEEE Transactions on Communications, vol. 46, No. 12, Dec. 1998, pp. 1693-1699.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Kaiser et al., Multi-Carrier CDMA with Iterative Decoding and Soft-Interference Cancellation, Proceedings of Globecom 1997, vol. 1, pp. 523-529.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

Hall et al., Design and Analysis of Turbo Codes on Rayleigh Fading Channels, IEEE Journal on Selected Areas in Communications, vol. 16, No. 2, Feb. 1998, pp. 160-174.

High Date Rate (HDR) Solution, Qualcomm, Dec. 1998.

Azad et al., Multirate Spread Spectrum Direct Sequence CDMA Techniques, 1994, The Institute of Electrical Engineers.

Ejzak et al., Lucent Technologies Air Interface Proposal for CDMA High Speed Data Service, Revision 0.1, May 5, 1997.

Krisely, Lucent Technologies Air Interface Proposal for CDMA High Speed Data Service, Jan. 16, 1997.

Kumar et al., An Access Scheme for High Speed Packet Data Service on IS-95 based CDMA, Feb. 11, 1997.

Ejzak et al., Lucent Technologies Air Interface Proposal for CDMA High Speed Data Service, Apr. 14, 1997.

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Chih-Lin I et al., Variable Spreading Gain CDMA with Adaptive Control for True Packet Switching Wireless Network, 1995, pp. 725-730.

Skinner et al., Performance of Reverse-Link Packet Transmission in Mobile Cellular CDMA Networks, IEEE, 2001, pp. 1019-1023.

Lau et al., A Channel-State-Dependent Bandwidth Allocation scheme for Integrated Isochronous and Bursty Media Data in a Cellular Mobile Information System, IEEE, 2000, pp. 524-528.

Elhakeem, Congestion Control in Signalling Free Hybrid ATM/CDMA Satellite Network, IEEE, 1995, pp. 783-787.

Chung, Packet Synchronization and Identification for Incremental Redundancy Transmission in FH-CDMA Systems, 1992, IEEE, pp.292-295.

High Data Rate (HDR), cdmaOne optimized for high speed, high capacity data, Wireless Infrastructure, Qualcomm, Sep. 1998.

Viterbi, The Path to Next Generation Services with CDMA, Qualcomm Incorporated, 1998 CDMA Americas Congress, Los Angeles, California, Nov. 19, 1998.

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Bell Labs Technical Journal, Lucent Technologies, vol. 2, No. 3, Summer 1997.

Puleston, PPP Protocol Spoofing Control Protocol, Global Village Communication (UK) Ltd., Feb. 1996.

Simpson, W. (Editor). "RFC 1661 - The Point-to Point Protocol (PPP)." Network Working Group, Jul. 1994, pp. 1-35. http://www.faqs.org/rfcs/rfc1661.html.

Simpson, W. (Editor). "RFC 1662 - PPP in HDLC-Like Framing." Network Working Group, Jul. 1994, pp. 1-17. http://www.faqs.org/rfcs/rfc1662.html.

Stage 1 Service Description for Data Services - high Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*MSC-BS Interface for Public 800 MHz.* TIA/EIA/IS-634. TIA/EIA Interim Standard, Dec. 1995.

*MSC-BS Interface (A-Interface) for Public 800 MHz.* TIA/EIA/IS-634-A. TIA/EIA Interim Standard (Revision of TIA/EIA/IS-634) Jul. 1998.

Honkasalo, Harri. *High Speed Data Air Interface.* 1996.

*Data Services Option Standard for Wideband Spread Spectrum Digital Cellular System.* TIA/EIA/IS-99. TIA/EIA Interim Standard. Jul. 1995.

Knisely, Douglas, N. Telecommunications Industry Association Subcommittee TR-45.5 - *Wideband Spread Spectrum Digital Technologies Standards.* Banff, Alberta. Feb. 24, 1997 (TR45.5/97.02.24)21.

Ott, David TR45.5, CDMA WBSS Technical Standards Meeting Summary. Feb. 24-28, 1997 Banff, Alberta.

Knisely, Douglas, N. Telecommunications Industry Association Subcommittee TR-45.5- *Wideband Spread Sprectrum Digital Technologies Standards, Working Group III - Physical Layer.* Banff, Alberta. Feb. 24, 1997 (TR45.5/97.02.24)22.

Ejak, et al. *Proposal for High Speed Packet Data Service, Version 0.1.* Lucent Technologies, Jan. 16, 1997.

Attachment 2, *High Speed Data RLP* Lucent Technologies, Version 0.1, Jan. 16, 1997.

*Data Services Options Standard for Wideband Spread Spectrum Systems: Packet Data Services.* PN-3676.5 (to be published as TIA/EIA/IS-707.5) Ballot Version, May 30, 1997.

*Telecommunications Industry Association Meeting Summary.* Task Group I, Working Group III, Subcommitte TR45.5. Feb. 24-27, 1997. Banff, Alberta.

WWW.CDG.ORG/NEWS/PRESS/1997.ASP. CDA Press Release Archive, 1997.

*Physical Layer Standard for cdma2000 Spread Spectrum Systems, Release C.* TIA/EIA Interim Standard. TIA/EIA/IS-2000.2C. May, 2002.

*Data Service Options for Wideband Spread Spectrum Systems.* TIA/EIA Interim Standard. TIA/EIA/IS-707-A. Apr. 1999.

*Upper Layer (Layer 3) Signaling Standard for cdma2000 Spread Spectrum Systems, Release C.* TIA/EIA Interim Standard. TIA/EIA/IS-2000.5-C. May, 2002.

*Introduction to cdma2000 Spread Spectrum Systems, Release C.* TIA/EIA Interim Standard. TIA/EIA/IS-2000.1-C. May, 2002.

Motorola, Version 1.0. *Motorola High Speed Data Air Interface Proposal Comparisions and Recommendations.* Jan. 27, 1997.

*Telecommunications Industry Association Meeting Summary.* Task Group I, Working Group III, Subcommitte TR45.5. Jan. 6-8, 1997. Newport Beach, California.

Shacham, et al., "A Selective-Repeat-ARQ Protocol for Parallel Channels and Its Resequencing Analysis," IEEE Transactions On Communications, XP000297814, 40 (4): 773-782 (Apr. 1997).

Attachment 2, *High Speed Data RLP* Lucent Technologies, Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung, Packet Synchronization and Identification for Incremental Redundancy Transmission in FH-CDMA Systems, 1992, IEEE, pp. 292-295.

Data Service Options for Wideband Spread Spectrum Systems. TIA/EIA Interim Standard. TIA/EIA/IS-707-A. Apr. 1999.

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Honkasalo, Harri. *High Speed Data Air Interface.* 1996.

IBE, "Networks and Remote Access. Protocols, Problems, and Solutions, " DMK Publishers, p. 56 (2002).

*Introduction to cdma2000 Spread Spectrum Systems, Release C.* TIA/EIA Interim Standard. TIA/EIA/IA-2000.1-C. May, 2002.

Kaiser et al., Multi-Carrier CDMA with Iterative Decoding and Soft-Interference Cancellation, Proceedings of Globecom 1997, vol. 1, pp. 523-529.

Knisely, Douglas, N. Telecommunications Industry Association Subcommitte TR-45.5- *Wideband Spread Spectrum Digital Technologies Standards.* Banff, Alberta. Feb. 24, 1997 (TR45.5/97.02.24)21.

Knisely, Douglas, N. Telecommunications Industry Association Subcommittee TR-45.5- *Wideband Spread Spectrum Digital Technologies Standards, Working Group III - Physical Layer.* Banff, Alberta. Feb. 24, 1997 (TR45.5/97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Department Bandwidth Allocation scheme for Integrated Isochronous and Bursty Media Data in a Cellular Mobile Information System, IEEE, 2000, pp. 524-528.

Liu et al., Channel Access and Interference Issues in Multi-Code DS-CDMA Wireless Packet (ATM) Networks, Wireless Networks 2, pp. 173-196, 1996.

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Melanchuk et al. *CDPD and Emerging Digital Cellular Systems*, Digest of Papers of COMPCN, Computer Society conference 1996, Santa Clara, CA, No. CONF. 41, Feb. 25, 1996, pp. 2-8, XP000628458.

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Dual-Mode Wideband Spread Spectrum Cellular System, TIA/EIA Interim Standard, TIA/EIA/IS-95-A (Revision to TIA/EIA/IS-95), May 1995, pp. 1-742.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations.* Jan. 27, 1997.

*MSC-BS Interface(A-Interface ) for Public 800 MHz.* TIA/EIA/IS-634-A. TIA/EIA Interim Standard (Revision of TIA/EIA/IS-634) Jul. 1998.

*MSC-BS Interface for Public 800 MHz.* TIA/EIA/IS-634. TIA/EIA Interim Standard, Dec. 1995.

Network Wirleless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May, 2002.

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transaction on Communications, vol. 46, No. 12, Dec. 1998, pp. 1693-1699.

Shacham, et al., "A Selective-Repeat-ARQ Protocol for Parallel Channels and Its Resequencing Analysis," IEEE Transactions On Communications, XP000297814, 40 (4): 773-782 (Apr. 1997).

Simpson, W. (Editor). "RFC 1661 - The Point-to-Point Protocol (PPP)." Network Working Group, Jul. 1994, pp. 1-35. http://www.faqs.org/rfcs/rfc1661.html.

Simpson, W. (Editor). "RFC 1662 - PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services - High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*Tantivy Communications, Inc. v. Lucent Technologies, Inc.*, Markman Order, Civil Action No. 2:04-CV-79, (Aug. 11, 1995).

*Telecommunications Industry Association Meeting Summary.* Task Group I, Working Group III, Subcommittee TR45.5. Feb. 24-27, 1997. Banff, Alberta.

*Telecommunications Industry Association Meeting Summary.* Task Group I, Working Group III, Subcommittee TR45.5. Jan. 6-8, 1997. Newport Beach, California.

*Upper Layer (Layer 3 ) Signaling Standard for cdma200 Spread Spectrum Systems, Release C.* TIA/EIA Interim Standard. TIA/EIA/IS-2000.5-C. May, 2002.

Viterbi, "A Constructive (Backward Compatible) Approach for Migration to Wider Band Wireless Services," Qualcomm Incorporated, $3^{rd}$ Generation Wider Band CDMA Technology Conference (Feb. 25, 1998).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

WWW.CDG.ORG/NEWS/PRESS/1997.ASP. CDA Press Release Archive, 1997.

Attachment 2, *High Speed Data RLP* Lucent Technologies, Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packer Data, System Specification, Release 1.1, Jan. 19, 1995.

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung, Packet Synchronization and Identification for Incremental Redundancy Transmission in FH-CDMA Systems, 1992, IEEE, pp. 292-295.

Data Service Options for Wideband Spread Spectrum Systems, TIA/EIA Interim Standard, TIA/EIA/IS-707, Feb. 1998.

*Data Service Options for Wideband Spread Spectrum Systems.* TIA/EIA Interim Standard. TIA/EIA/IS-707-A. Apr. 1999.

Data Service Options for Wideband Spread Spectrum Systems: Introduction, PN-3676.1 (to be published as TIA/EIA/IS-707.1), Mar. 20, 1997 (Content Revision 1).

*Data Service Options Standard for Wideband Spread Spectrum Digital Cellular System.* TIA/EIA/IS-99. TIA/EIA Interim Standard. Jul. 1995.

*Data Service Options Standard for Wideband Spread Spectrum Systems: Packet Data Services.* PN-3676.5 (*to be published as TIA/EIA/IS-707.5*) *Ballot Version*, May 30, 1997.

Data Standard, Packet Data Section, PN-3676.5 (to be published as TIA/EIA/IS-Data.5), Dec. 8, 1996, Version 02 (Content Revision 03).

Draft Text for "*95C" Physical Layer (Revision 4), Part 1, Document #531-981-20814-95C, Part 1 on 3GPP2 website (ftp:frp.3gpp2.org/tsgc/working/1998/1298_Maui/Wg3-TG1/531-98120814-95c,%20part%201.pdf).

Draft Text for "95C" Physical Layer (Revision 4), Part 2, Document #531-981-20814-95C, part 2 on 3GPP2 website (ftp:frp.3gpp2.org/tsgc/working/1998/1298_Maui/Wg3-TG1/531-98120814-95c,%20part%201.pdf, 1998).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak et al., *Proposal for High Speed Packet Data Service, Version 0.1.* Lucent Technologies, Jan. 16, 1997.

Elhakeem, Congestion Control in Signalling Free Hybrid ATM/CDMA Satellite Network, IEEE, 1995, pp. 783-787.

Hall et al., Design and Analysis of Turbo Codes on Rayleigh Fading Channels, IEEE Journal on Selected Areas in Communications, vol. 16, No. 2, Feb. 1998, pp. 160-174.

High Data Rate (HDR) Solution, Qualcomm, Dec. 1998.

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. 11, pp. 649-653.

Honkasalo, Harri. *High Speed Data Air Interface.* 1996.

IBE, "Networks and Remote Access, Protocols, Problems, and Solutions," DMK Publishers, p. 56 (2002).

*Introduction to cdma2000 Spread Spectrum Systems, Release C.* TIA/EIA Interim Standard. TIA/EIA/IS-2000.1C. May, 2002.

Kaiser et al., Multi-Carrier CDMA with Iterative Decoding and Soft-Interference Cancellation, Proceedings of Globecom 1997, vol. 1, pp. 523-529.

Knisely, Douglas, N. Telecommunications Industry Association Subcommittee TR-45.5 - *Wideband Spread Spectrum Digital Technologies Standards.* Banff, Alberta. Feb. 24, 1997 (TR45.597.02.24)21.

Knisely, Douglas, N. Telecommunications Industry Association Subcommittee TR-45.5 - *Wideband Spread Spectrum Digital Technologies Standards, Working Group III - Physical Layer.* Banff, Alberta. Feb. 24, 1997 (TR45.5-97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Liu et al., Channel Access and Interference Issues in Multi-Code DS-CDMA Wireless Packet (ATM) Networks, Wireless Networks 2, pp. 173-196, 1996.

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Melanchuk et al. *CDPD and Emerging Digital Cellular Systems*, Digest of Papers of COMPCN, Computer Society Conference 1996, Santa Clara, CA, No. Conf. 41, Feb. 25, 1996, pp. 2-8, XP000628458.

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Dual-Mode Wideband Spread Spectrum Cellular System, TIA/EIA Interim Standard, TIA/EIA/IS-95-A (Revision of TIA/EIA/IS-95), May 1995, pp. 1-742.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations.* Jan. 27, 1997.

MSC-BS Interface (A-Interface) for Public 800 MHz. TIA/EIA/IS-634-A. TIA/EIA Interim Standard (Revision of TIA/EIA/IS-634) Jul. 1998.

MSC-BS Interface for Public 800 MHz. TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May, 2002.

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

*Samsung Electronics Co., Ltd.* v. *Interdigital Communications Corporation*, et al., First Amended Complaint, Civil Action No. 07-167, United States District Court for the District of Delaware.

Shacham, et al., "A Selective-Repeat-ARQ Protocol for Parallel Channels and Its Resequencing Analysis," IEEE Transactions On Communications, XP000297814, 40(4): 773-782 (Apr. 1997).

Simpson, W. (Editor). "RFC 1661 - The Point-to-Point Protocol (PPP)." Network Working Group, Jul. 1994, pp. 1-35. http://www.faqs.org/rfcs/rfc1661.html.

Simpson, W. (Editor). "RFC 1662 - PPP in HDLC-Like Framing." Network Working Group, Jul. 1994. pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services - High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995, TIA/EIA Telecommunications Systems Bulletin.

*Tantivy Communications, Inc. v. Lucent Technologies, Inc.*, Plaintiff's Second Amended Complaint, Civil Action No. 2:04-CV-79, United States District Court for the Eastern District of Texas, Marshall Division.
*Tantivy Communications, Inc. v. Lucent Technologies, Inc.*, Lucent Technologies, Inc.'s Preliminary Invalidity Contentions, Civil Action No., 2:04-CV-79, United States District Court for the Eastern District of Texas, Marshall Division.
*Tantivy Communications, Inc. v. Lucent Technologies, Inc.*, Markman Order, Civil Action No. 2:04-CV-79, (Aug. 11, 1995).
*Telecommunications Industry Association Meeting Summary.* Task Group I, Working Group III, Subcommittee TR45.5. Feb. 24-27, 1997. Banff, Alberta.
*Telecommunications Industry Association Meeting Summary.* Task Group I, Working Group III, Subcommittee TR45.5. Jan. 6-8, 1997. Newport Beach, California.
*Upper Layer(Layer 3) Signaling Standard for cdma2000 Spread Spectrum Systems, Release C*. TIA/EIA Interim Standard. TIA/EIA/IS-2000.5-C. May, 2002.
Viterbi, "A Constructive (Backward Compatible) Approach for Migration to Wider Band Wireless Services, " Qualcomm Incorporated, $3^{rd}$ Generation Wider Band CDMA Technology Conference (Feb. 25, 1998).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DE-CDMA, IEEE Global Communications Conference, Phoenix, Arizona, USA, Nov. 3-8, 1007, Gol. III, pp. 1548-1551.
WWW.CDG.ORG/NEWS/PRESS/1997.ASP._CDA Press Release Archive, 1997.
Andermo et al., "Code Division Testbed, CODIT," IEEE International Conference on Universal Personal Communications, vol. 1, pp. 397-401 (Oct. 12-15, 1993).
Andermo et al., "CODIT and Third Generation Systems," $4^{th}$ IEEE International Conference on Universal Personal Communications Record, pp. 843-847 (Nov. 6-10, 1995).
Andermo et al., "CODIT, a Testbed Project Evaluating DS-CDMA for UMTS/FPLMTS," IEEE $44^{th}$ Vehicular Technology Conference, vol. 1, pp. 21-25 (Jun. 8-10, 1994).
Andermo et al., "Overview of CODIT Project," Proceedings of the RACE Mobile Telecommunications Summit, pp. 33-42 (Nov. 1995).
Attachment 2 *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
CODIT Final Review Report, Issue 2.0 (Nov. 21, 1995).
Data Service Options for Wideband Spread Spectrum Systems, TIA/EIA Interim Standard. TIA/EIA/IS-707, Feb. 1998.
*Data Service Options for Wideband Spread Spectrum Systems*, TIA/EIA Interim Standard. TIA/EIA/IS-707-A, Apr. 1999.

Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System*. TIA/EIA/IS-99. TIA/EIA Interim Standard. Jul. 1995.
*Data Services Options Standard for Wideband Spread Spectrum Systems*: Packet Data Services. PN-3676.5 (to be published as TIA/EIA/IS-707.5) Ballot Version, May 30, 1997.
Data Standard, Packet Data Section, PN-3676.5 9to be published as TIA/EIA/IS-DATA.5), Dec. 8, 1996, Version 02 (Content Revision 03).
Draft Text for "*95C" Physical Layer (Revision 4), Part 1, Document #531-981-20814-95C, Part 1 on 3GPP2 website (ftp://ftp.3gpp2.org/tsgc/working/1998/1298 Maui/WG3-TG1/531-98120814-95c.%20part%201.pdf, 1998).
Draft Text for "95C" Physical Layer (Revision 4), Part 2, Document #531-981-20814-95C, part 2 on 3GPP2 website (ftp://ftp.3gpp2.org/tsgc/working/1998/1298_ Maui/WG3-TG1/531-98120814-95c.%20part%201.pdf, 1998).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak et al., *Proposal for High Speed Packet Data Service*, Version 0.1, Lucent Technologies, Jan. 16, 1997.
Elhakeem, Congestion Control in Signalling Free Hybrid ATM/CDMA Satellite Network, IEEE, 1995, pp. 783-787.
Hall et al., Design and Analysis of Turbo Codes on Rayleigh Fading Channels, IEEE Journal on Selected Areas in Communications, vol. 16, No. 2, Feb. 1998, pp. 160-174.
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communictions Conference, Phoenix, Arizona, USA, Nov. 3-8, 1997, vol. II, pp. 649-653.
Honkasalo, Harri. *High Speed Data Air Interface*. 1996.
IBE, "Networks and Remote Access. Protocols, Problems, and Solutions," DMK Publishers, p. 56 (2002).
Introduction to cdma2000 Spread Spectrum Systems, Release C. TIA/EIA Interim Standard. TIA/EIA/IS-2000. 1-C. May, 2002.
Kaiser et al., Multi-Carrier CDMA with Iterative Decoding and Soft-Interference Cancellation, Proceedings of Globecom 1997, vol. 1, pp. 523-529.
Knisely, Douglas, N. Telecommunications Industry Association Subcommittee TR-45.5-*Wideband Spread Spectrum Digital Technologies Standards*. Banff, Alberta. Feb. 24, 1997 (TR45.5/Feb. 24, 1997)21.
Knisely, Douglas, N. Telecommunications Industry Association Subcommittee TR-45.5-*Wideband Spread Spectrum Digital Technologies Standards, Working Group III - Physical Layer*.Banff, Alberta. Feb. 24, 1997 (TR45.5/Feb. 24, 1997)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Liu et al., Channel Access and Interference Issues in Multi-Code DS-CDMA Wireless Packet (ATM) Networks, Wireless Networks 2, pp. 173-196, 1996.
Lucas, "Synchronisation Procedure in Up and Down-Link in the CoDiT Testbed," RACE Mobile Telecommunications Workshop (May 1994).
Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Melanchuk et al. CDPD and Emerging Digital Cellular Systems, Digest of Papers of COMPCN, Computer Society Conference 1996, Santa Clara, CA, No. Conf. 41, Feb. 25, 1996, pp. 2-8, XP000628458.

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Dual-Mode Wideband Spread Spectrum Cellular System, TIA/EIA Interim Standard, TIA/EIA/IS-95-A (Revision of TIA/EIA/IS-95), May 1995, pp. 1-742.

Mobile Station-Base Station Compatibility Standard for Wideband Spread Spectrum Cellular System, TIA/EIA Standard, TIA/EIA/IS-95-B (upgrade and Revision of TIA/EIA-95-A), Mar. 1999.

Morris, "UMTS and the Race II Codit Project," IEEE Colloquium on Mobile Telecommunications Towards the Year 2000, pp. 8/1-8/4 (Oct. 1994).

Motorola, Version 1.0 *Motorola High Speed Data Air Interface Proposal Comparisions and Recommendations*. Jan. 27, 1997.

MSC-BS Interface (A-Interface) for Public 800 MHz. TIA/EIA/IS-634-A. TIA/ EIA Interim Standard (Revision of TIA/EIA/IS-634) Jul. 1998.

MSC-BS Interface for Public 800 MHz. TIA/EIA/IS-634. TIA/ EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May, 2002.

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Samsung Electronics Co., Ltd. v. Interdigital Communications Corporation, et al., First Amended Complaint, Civil Action No. 07-167, United States District Court for the District of Delaware.

Shacham, et al., "A Selective-Repeat-ARQ Protocol for Parallel Channels and Its Resequencing Analysis," IEEE Transactions On Communications, XP000297814, 40 (4): 773-782 (Apr. 1997).

Simpson, W. (Editor). "RFC 1661 - The Point-to-Point Protocol (PPP)." Network Working Group, Jul. 1994, pp. 1-35. http://www.faqs.org/rfcs/rfc1661.html.

Simpson, W. (Editor). "RFC 1662 - PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services - High Speed Data Services (Version 0.10) CDG RF 38. Dec. 3, 1996.

*Support for 14.4 kbps Data Rate and PCS Interaction for Wideband Spread Spectrum Cellular Systems*. TSB74, Dec. 1995. TIA/EIA Telecommunications Systems Bulletin.

Tantivy Communications, Inc. v. Lucent Technologies, Inc., Lucent Technologies, Inc.'s Preliminary Invalidity Contentions, Civil Action No. 2:04-CV-79, United States District Court for the Eastern District of Texas, Marshall Division.

Tantivy Communications, Inc. v. Lucent Technologies, Inc., Markman Order, Civil Action No. 2:04-CV-79, (Aug. 11, 1995).

Tantivy Communications, Inc. v. Lucent Technologies, Inc., Plaintiff' Second Amended Complaint, Civil Action No. 2:04-CV-79, United States District Court for the Eastern District of Texas, Marshall Division.

*Telecommunication Industry Association Meeting Summary*. Task Group I, Working Group III, Subcommittee TR45.5. Feb. 24-27, 1997. Banff, Alberta.

*Telecommunication Industry Association Meeting Summary*. Task Group I, Working Group III, Subcommittee TR45.5. Jan 6-8, 1997. Newport Beach, California.

*Upper Layer (Layer 3) Signaling Standard for cdma2000 Spread Spectrum Systems, Release C.* TIA/EIA Interim Standard. TIA/EIA/IS-2000.5-C. May, 2002.

Viterbi, "A Constructive (Backward Compatible) Approach for Migration to Wider Band Wireless Services," Qualcomm Incorporated, $3^{rd}$ Generation Wider Band CDMA Technology Conference (Feb. 25, 1998).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1997, Gol. III, pp. 1548-1551.

WWW.CDG.ORG/NEWS/PRESS/1997.ASP. CDA Press Release Archive, 1997.

Andermo et al., "Code Division Testbed, CODIT," IEEE International Conference on Universal Personal Communications, vol. 1, pp. 397-401 (Oct. 12-15, 1993).

Andermo et al., "CODIT and Third Generation Systems," $4^{th}$ IEEE International Conference on Universal Personal Communications Record, pp. 843-847 (Nov. 6-10, 1995).

Andermo et al., "CODIT, a Testbed Project Evaluationg DS-CDMA for UMTS/FPLMTS," IEEE $44^{th}$ Vehicular Technology Conference, vol. 1, pp. 21-25 (Jun. 8-10, 1994).

Andermo et al., "Overview of CODIT Project," Proceedings of the RACE Mobile Telecommunications Summit, pp. 33-42 (Nov. 1995).

Attachment 2, *High Speed Data RLP* Lucent Technologies, Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budla et al., Cellular Digital Packet Data Networks, Bell Labs Technical Journal, Summer 1997, pp. 164-181.

Cellular Digital Packet Data, System Specification, Release 1.1, Jan. 19, 1995.

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jun. 25, 1995.

Chih-Lin I et al., Variable Spreading Gain CDMA with Adaptive Control for True Packet Switching Wireless Network, 1995 pp. 725-730.

Chung, Packet Synchronization and Identification for Incremental Redundancy Transmission in FH-CDMA Systems, 1992, IEEE, pp. 292-295.

CODIT Final Review Report, Issue 2.0 (Nov. 21, 1995).

Data Service Options for Wideband Spread Spectrum Systems, TIA/EIA Interim Standard. TIA/EIA/IS-707, Feb. 1998.

*Data Service Options for Wideband Spread Spectrum Systems.* TIA/EIA Interim Standard. TIA/EIA/IS-707-A, Apr. 1999.

Data Service Options for Wideband Spread Spectrum Systems: Introduction, PN-3676.1 (to be published as TIA/EIA/IS-707.1), Mar. 20, 1997 (Content Revision 1).

*Data Services Option Standard for Wideband Spread Spectrum Digital Cellular System.* TIA/EIA/IS-99. TIA/EIA Interim Standard. Jul. 1995.

*Data Services Options Standard for Wideband Spread Spectrum Systems: Packet Data Services. PN-3676.5 (to be published as TIA/EIA/IS-707.5) Ballot Version*, May 30, 1997.

Data Standard, Packet Data Section, PN-3676.5 (to be published as TIA/EIA/IS-DATA.5), Dec. 8, 1996, Version 02 (Content Revision 03).

Draft Text for "*95C" Physical Layer (Revision 4), Part 1, Document #531-981-20814-95C, Part 1 on 3GPP2 website (ftp://ftp.3gpp2.org/tsgc/working/1998/1298 MauiWG3-TG1/531-98120814-95c,%20part%201.pdf, 1998).

Draft Text for "95C" Physical Layer (Revision 4), Part 2, Document #531-981-20814-95C, part 2 on 3GGP2 website (ftp://ftp.3gpp2.org/tsgc/working/1998/1298_ MauiWG3-TG1/531-98120814-95c,%20part%201.pdf, 1998).

Ejzak et al., Lucent Technologies Air Interface Proposal for CMDA High Speed Data Service, Revision 0.1 May 5, 1997.

Ejzak et al., Lucent Technologies Air Interface Proposal for CMDA High Speed Data Service, Apr. 14, 1997.

Ejzak et al., *Proposal for High Speed Packet Data Service*, Version 0.1 Lucent Technologies, Jan. 16, 1997.

Elhakeem, Congestion Control in Signalling Free Hybrid ATM/CDMA Satellite Network, IEEE, 1995, pp. 783-787.

Hall et al., Design and Analysis of Turbo Codes on Rayleigh Fading Channels, IEEE Journal on Selected Areas in Communications, vol. 16, No. 2, Feb. 1998, pp. 160-174.

High Data Rate (HDR) Solution, Qualcomm, Dec. 1998.

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Honkasalo, Hari. *High Speed Data Air Interface.* 1996.

IBE, "Networks and Remote Access. Protocols, Problems, and Solutions," DMK Publishers, p. 56 (2002).

*Introduction to cdma2000 Spread Spectrum Systems, Release C.* TIA/EIA Interim Standard. TIA/EIA/IS-2000.1 C. May, 2002.

Kaiser et al., Multi-Carrier CDMA with Iterative Decoding and Soft-Interference Cancellation, Proceedings of Globecom 1997, vol. 1, pp. 523-529.

Knisely, Douglas, N. Telecommunicatins Industry Association Subcommittee TR-45.5 - *Wideband Spread Spectrum Digital Technologies Standards*. Banff, Alberta. Feb. 24, 1997 (TR45.5/Feb. 24, 1997)21.

Knisely, Douglas, N. Telecommunicatins Industry Association Subcommittee TR-45.5 - *Wideband Spread Spectrum Digital Technologies Standards, Working Group III - Physical Layer*. Banff, Alberta. Feb. 24, 1997 (TR45.5/Feb. 24, 1997)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vil. 14, No.3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Liu et al., Channel Access and Interference Issues in Multi-Code DS-CDMA Wireless Packet (ATM) Networks, Wireless Networks 2, pp. 173-196, 1996.

Lucas, "Synchronisation Procedure in Up and Down-Link in the CoDiT Testbed," RACE Mobile Telecommunications Workshop (May 1994).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C) Feb. 21, 1997.

Melanchuk et al. *CDPA and Emerging Digital Cellular Systems*, Digest of Papers of COMPCN, Computer Society Conference 1996, Santa Clara, CA, No. Conf. 41, Feb. 25, 1996, pp. 2-8, XP000628458.

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Dual-Mode Wideband Spread Spectrum Cellular System, TIA/EIA Interim Standard, TIA/EIA/IS-95-A (Revision of TIA/EIA/IS-95), May 1995, pp. 1-742.

Mobile Station-Base Station Compatibility Standard for Wideband Spread Spectrum Cellular System, TIA/EIA Standard, TIA/EIA-95-B (Upgrade and Revision of TIA/EIA-95-A), Mar. 1999.

Morris, "UMTS and the RACE II CODIT Project," IEEE Colloquium on Mobile Telecommunications Towards the Year 2000, pp. 8/1-8/4 (Oct. 1994).

Motorola, Version 1.0 *Motorola High Speen Data Air Interface Proposal Comparisions and Recommendations*. Jan. 27, 1997.

*MSC-BS Interface (A-Interface) for Public 800 MHz*. TIA/EIA/IS-634-A. TIA/EIA Interim Standard (Revision of TIA/EIA/IS-634) Jul. 1998.

*MSC-BS Interface for Public 800 MHz*. TIA/EIA/IS-634. TIA/EIA Interim Standard Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May, 2002.

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Samsung Electronics Co., Ltd. v. Interdigital Communications Corporation, et al., First Amended Complaint, Civil Action No. 07-167, United States District Court for the District of Delaware.

Shacham, et al., "A Selective-Repeat-ARQ Protocol for Parallel Channels and Its Resequencing Analysis," IEEE Transaction On Communications, XP000297814, 40 (4): 773-782 (Apr. 1997).

Simpson, W. (Editor). "RFC 1661 - The Point-to Point Protocol (PPP)." Network Working Group, Jul. 1994, pp. 1-35. http://www.faqs.org/rfcs/rfc1661.html.

Simpson, W. (Editor). "RFC 1662 - PPP in HDLC-Like Framing" Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services - High Speed Data Services (Version 0.10) CDG RF 38. Dec. 3, 1996.

*Support for 14.4 kbps Data Rate and PCS Interaction for Wideband Spread Spectrum Cellular Systems*, TSB74, Dec. 1995. TIA/EIA Telecommunications Systems Bulletin.

Tantivy Communications, Inc. v. Lucent Technologies, Inc., Lucent Technologies, Inc.'s Preliminary Invalidity Contentions, Civil Action No. 2:04-CV-79, United States District Court for the Eastern District of Texas, Marshall Division.

Tantivy Communications, Inc. v. Lucent Technologies, Inc., Lucent Technologies, Inc., Markman Order, Civil Action No. 2:04-CV-79, (Aug. 11, 1995).

Tantivy Communications, Inc. v. Lucent Technologies, Inc., Lucent Technologies, Inc., Plaintiff's Second Amended Complaint, Civil Action No. 2:04-CV-79, United States District Court for the Eastern District of Texas, Marshall Division.

* cited by examiner

MAIN:
    DO Always
        Process Port Request
        Process Bandwidth Release
        Process Bandwidth Requests
        Locate and tear down unused sub-channels
    ENDDO
                                  710

PORT REQUEST:
    Make reservation in least utilized sub-band
        Reservation decision based on % of available Sub-Channels to assign (Based on parallel user BW vs. throughput efficiency)
    IF reservation was made
        Send frequency and code assignment
        Update allocations
    ELSE
        Add port request to port queue
        Calculate expected wait time
        Send wait message to user
    ENDIF
                                  720

BANDWIDTH RELEASE:
    Notify channel-bonding function
    Return frequency and code to available pool
    Update radio record
                                  730

BANDWIDTH REQUEST:
    Select highest priority with lowest bandwidth utilization, including need-allocation gap
    Check other sub-bands for greatest available sub channels (Switch sub-bands if difference in sub-band space exceeds payback threshold)
    Assign sub channels based on need, priority, availability
    Notify channel bonding function
    Update radio record
                                  740

FIG. 7

DYNAMIC BANDWIDTH ALLOCATION TO TRANSMIT A WIRELESS PROTOCOL ACROSS A CODE DIVISION MULTIPLE ACCESS (CDMA) RADIO LINK

CROSS REFERENCE TO RELATED APPLICATIONS

This application is a Continuation of U.S. application Ser. No. 10/345,791 filed Jan. 16, 2003, now abandoned entitled "Dynamic Bandwidth Allocation to Transmit a Wireless Protocol Across a Code Division Multiple Access (CDMA) Radio Link, which is a Continuation of U.S. application Ser. No. 09/596,425, filed Jun. 19, 2000, now U.S. Pat. No. 6,526, 281 entitled "Dynamic Bandwidth Allocation to Transmit a Wireless Protocol Across a Code Division Multiple Access (CDMA) Radio Link," which in turn is a Continuation of U.S. application Ser. No. 08/992,760, filed Dec. 17, 1997, now U.S. Pat. No. 6,081,536 entitled "Dynamic Bandwidth Allocation to Transmit a Wireless Protocol Across a Code Division Multiple Access (CDMA) Radio Link," which itself claims the benefit of U.S. Provisional Application No. 60/050,338 filed Jun. 20, 1997 entitled "Dynamic Bandwidth Allocation to Transmit a Wireless Protocol Across a Code Division Multiple Access (CDMA) Radio Link," and U.S. Provisional Application No. 60/050,277 filed Jun. 20, 1997 entitled "Protocol Conversion and Bandwidth Reduction Technique Providing Multiple nB+D ISDN Basic Rate Interface Links Over a Wireless Code Division Multiple Access Communication System," the entire teachings of all of which are incorporated herein by reference.

BACKGROUND OF THE INVENTION

The increasing use of wireless telephones and personal computers by the general population has led to a corresponding demand for advanced telecommunication services that were once thought to only be meant for use in specialized applications.

For example, in the late 1980's, wireless voice communication such as available with cellular telephony had been the exclusive province of the businessman because of expected high subscriber costs. The same was also true for access to remotely distributed computer networks, whereby until very recently, only business people and large institutions could afford the necessary computers and wireline access equipment.

However, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, high speed access to the Internet and other networks using existing wireless networks. This situation is most likely an artifact of several unfortunate circumstances. For example, the typical manner of providing high speed data service in the business environment over the wireline network is not readily adaptable to the voice grade service available in most homes or offices. In addition, such standard high speed data services do not lend themselves well to efficient transmission over standard cellular wireless handsets.

Furthermore, the existing cellular network was originally designed only to deliver voice services. At present, the wireless modulation schemes in use continue their focus on delivering voice information with maximum data rates only in the range of 9.6 kbps being readily available. This is because the cellular switching network in most countries, including the United States, uses analog voice channels having a bandwidth from about 300 to 3600 Hertz. Such a low frequency channel does not lend itself directly to transmitting data at rates of 28.8 kilobits per second (kbps) or even the 56.6 kbps that is now commonly available using inexpensive wire line modems, and which rates are now thought to be the minimum acceptable data rates for Internet access.

Switching networks with higher speed building blocks are just now coming into use in the United States. Although certain wireline networks, called Integrated Services Digital Networks (ISDN), capable of higher speed data access have been known for a number of years, their costs have only been recently reduced to the point where they are attractive to the residential customer, even for wireline service. Although such networks were known at the time that cellular systems were originally deployed, for the most part, there is no provision for providing ISDN-grade data services over cellular network topologies.

ISDN is an inherently circuit switched protocol, and was, therefore, designed to continuously send bits in order to maintain synchronization from end node to end node to maintain a connection. Unfortunately, in wireless environments, access to channels is expensive and there is competition for them; the nature of the medium is such that they are expected to be shared. This is dissimilar to the usual wireline ISDN environment in which channels are not intended to be shared by definition.

SUMMARY OF THE INVENTION

In view of the foregoing background, an object of the present invention is to provide high speed data and voice service over standard wireless connections via a unique integration of ISDN protocols and existing cellular signaling such as is available with Code Division Multiple Access (CDMA) type digital cellular systems.

This and other objects, advantages and features in accordance with the present invention are provided by a CDMA user device comprising a CDMA transceiver, a controller connected to the CDMA transceiver, and communication session establishment software for establishing a communication session with a base station. The communication session comprises a plurality of layers including a physical layer.

The CDMA user device further comprises bandwidth negotiation software for negotiating with the base station an allocated bandwidth for the CDMA transceiver, physical layer connection software for establishing and releasing a physical layer connection between the CDMA transceiver and the base station, and state maintenance software for maintaining a state of at least one other layer during the communication session after termination of the physical layer.

The bandwidth negotiation software may comprise a routine for facilitating an assignment of at least one radio link to the CDMA transceiver in a CDMA channel. The at least one radio link may comprise a plurality of radio links having different bandwidths. The bandwidth negotiation software may comprise a routine for facilitating an assignment of at least one CDMA subchannel in a CDMA channel. The at least one CDMA subchannel may comprise a plurality of CDMA subchannels having different bandwidths.

The state maintenance software may be operable upon termination of the physical layer. The bandwidth negotiation software may comprise a routine that communicates a requested bandwidth to the base station. The CDMA transceiver may simultaneously transmit control, voice and data information. The CDMA transceiver may also simultaneously transmit control and data information on separate CDMA subchannels.

The CDMA user device may further comprise a channel multiplexer for multiplexing user information over a plurality of CDMA subchannels. The user information may comprise voice and data. In addition, a personal digital assistant (PDA) may be connected to the controller.

Another aspect of the present invention is directed to a CDMA user device comprising a personal digital assistant (PDA), a controller connected to the PDA, and a CDMA transceiver connected to the controller. A bandwidth allocation software implements a state machine comprising at least a state in which status of at least one layer of a communication session above a physical layer is maintained upon termination of the physical layer.

In accordance with another aspect of the invention, some portion of the available bandwidth is initially allocated to establish a communication session. Once the session has been established, if a subscriber unit has no data to present for transmission, namely, if the data path remains quiescent for some period of time, the previously assigned bandwidth is deallocated. In addition, it is preferable that not all of the previously assigned bandwidth be deallocated, but rather at least some portion be kept available for use by an in-session subscriber. If the inactivity continues for a further period of time, then even the remaining portion of the bandwidth can be deallocated from the session. A logical session connection at a network layer protocol is still maintained even if no subchannels are assigned.

In a preferred arrangement, a single subchannel is maintained for a predetermined minimum idle time for each network layer connection. This assists with more efficient management of channel setup and tear down.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 7 is a high level structured English description of a process performed by the base station to manage bandwidth dynamically according to the invention.

DETAILED DESCRIPTION OF THE INVENTION

Figure 1:
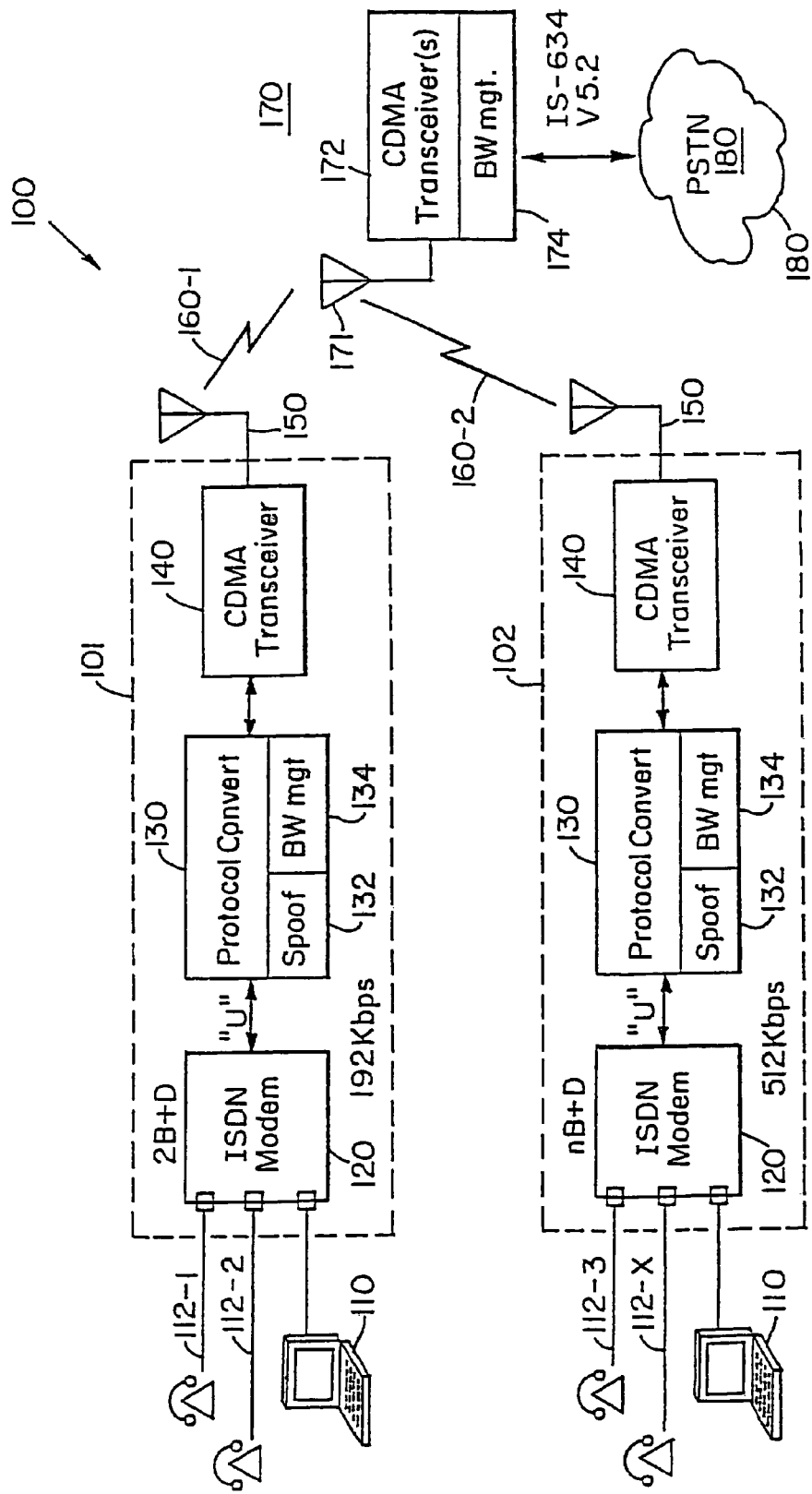
FIG. 1 is a block diagram of a wireless communication system making use of a bandwidth management scheme according to the invention.

Turning attention now to the drawings more particularly, FIG. 1 is a block diagram of a system 100 for providing high speed data and voice service over a wireless connection by seamlessly integrating a digital data protocol such as, for example, Integrated Services Digital Network (ISDN) with a digitally modulated wireless service such as Code Division Multiple Access (CDMA).

The system 100 consists of two different types of components, including subscriber units 101, 102 and base stations 170. Both types of these components 101 and 170 cooperate to provide the functions necessary in order to achieve the desired implementation of the invention. The subscriber unit 101 provides wireless data services to a portable computing device 110 such as a laptop computer, portable computer, personal digital assistant (PDA) or the like. The base station 170 cooperates with the subscriber unit 101 to permit the transmission of data between the portable computing device 110 and other devices such as those connected to the Public Switched Telephone Network (PSTN) 180.

More particularly, data and/or voice services are also provided by the subscriber unit 101 to the portable computer 110 as well as one or more other devices such as telephones 112-1, 112-2 (collectively referred to herein as telephones 112. (The telephones 112 themselves may in turn be connected to other modems and computers which are not shown in FIG. 1). In the usual parlance of ISDN, the portable computer 110 and telephones 112 are referred to as terminal equipment (TE). The subscriber unit 101 provides the functions referred to as a network termination type 1 (NT-1). The illustrated subscriber unit 101 is in particular meant to operate with a so-called basic rate interface (BRI) type ISDN connection that provides two bearer or "B" channels and a single data or "D" channel with the usual-designation-being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 may be integrated as a complete unit and sold as a single subscriber unit device 101.

The ISDN modem 120 converts data and voice signals between the terminal equipment 110 and 112 to format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions, which will be described in greater detail below. In general, spoofing 132 consists of insuring that the subscriber unit 101 appears to the terminal equipment 110, 112 that is connected to the public switched telephone network 180 on the other side of the base station 170 at all times.

The bandwidth management function 134 is responsible for allocating and deallocating CDMA radio channels 160 as required. Bandwidth management also includes the dynamic management of the bandwidth allocated to a given session by dynamically assigning sub-portions of the CDMA channels 160 in a manner which is more fully described below.

The CDMA transceiver 140 accepts the data from the protocol converter 130 and reformats this data in appropriate form for transmission through a subscriber unit antenna 150 over CDMA radio link 160-1. The CDMA transceiver 140 may operate over only a single 1.25 MHZ radio frequency channel or, alternatively, in a preferred embodiment, may be tunable over multiple allocatable radio frequency channels.

CDMA signal transmissions are then received at the base station and processed by the base station equipment 170. The base station equipment 170 typically consists of multichannel antennas 171, multiple CDMA transceivers 172, and a bandwidth management functionality 174. Bandwidth management controls the allocation of CDMA radio channels 160 and subchannels. The base station 170 then couples the demodulated radio signals to the Public Switch Telephone Network (PSTN) 180 in a manner which is well known in the art. For example, the base station 170 may communicate with the PSTN 180 over any number of different efficient communication protocols such as primary rate ISDN, or other LAPD based protocols such as IS-634 or V5.2.

It should also be understood that data signals travel bidirectionally across the CDMA radio channels 160, i.e., data signals originate at the portable computer 110 are coupled to the PSTN 180, and data signals received from the PSTN 180 are coupled to the portable computer 110.

Other types of subscriber units-such-as unit 102 may be used to provide higher speed data services. Such subscriber units 102 typically provide a service referred to as nB+D type service that may use a so-called Primary Rate Interface (PRI) type protocol to communicate with the terminal equipment 110, 112. These units provide a higher speed service such as 512 kbps across the U interface. Operation of the protocol converter 130 and CDMA transceiver 140 are similar for the nB+D type subscriber unit 102 as previously described for subscriber unit 101, with the understanding that the number of radio links 160 to support subscriber unit 102 are greater in number or each have a greater bandwidth.

Figure 2:
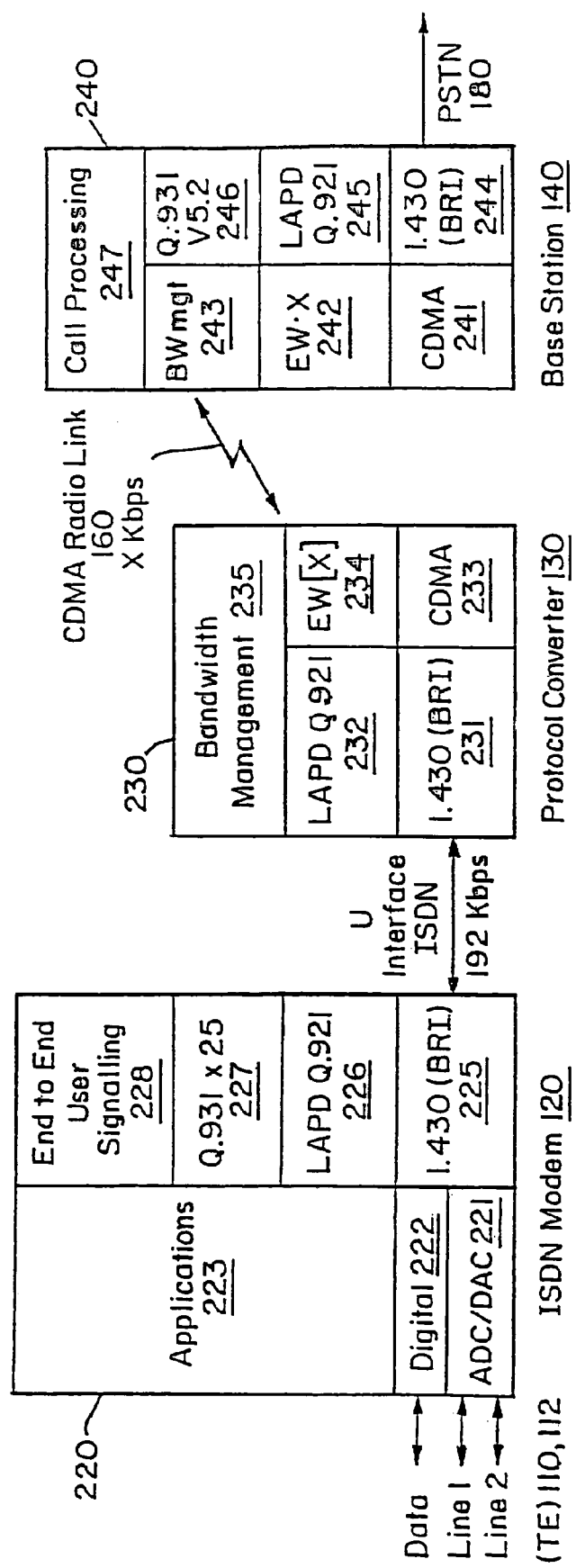
FIG. 2 is an Open System Interconnect (OSI) type layered protocol diagram showing where the bandwidth management scheme is implemented in terms of communication protocols.

Turning attention now to FIG. 2, the invention may be described in the context of a Open Systems Interconnect multilayer protocol diagram. The three protocol stacks 220, 230, and 240 are for the ISDN modem 120, protocol converter 130, and base station 170, respectively.

The protocol stack 220 used by the ISDN modem 120 is conventional for ISDN communications and includes, on the terminal equipment side, the analog to digital conversion (and digital to analog conversion) 221 and digital data formatting 222 at layer one, and an applications layer 223 at layer two. On the U interface side, the protocol functions include Basic Rate Interface (BRI) such as according to standard I.430 at layer one, a LAPD protocol stack at layer two, such as specified by standard Q.921, and higher level network layer protocols such as Q.931 or X.227 and high level end to end signaling 228 required to establish network level sessions between modes.

The lower layers of the protocol stack 220 aggregate two bearer (B)-channels to achieve a single 128 kilobits per second (kbps) data rate in a manner which is well known in the art. Similar functionality can be provided in a primary rate interface, such as used by subscriber unit 102, to aggregate multiple B channels to achieve up to 512 kbps data rate over the U interface.

The protocol stack 230 associated with the protocol converter 130 consists of a layer one basic rate interface 231 and a layer two LAPD interface 232 on the U interface side, to match the corresponding layers of the ISDN modem stack 220.

At the next higher layer, usually referred to as the network layer, a bandwidth management functionality 235 spans both the U interface side and the CDMA radio link side of the protocol converter stack 230. On the CDMA radio link side 160, the protocol depends upon the type of CDMA radio communication in use. An efficient wireless protocol referred to herein as EW[x] 234, encapsulates the layer one 231 and layer two 232 ISDN protocol stacks in such a manner that the terminal equipment 110 may be disconnected from one or more CDMA radio channels without interrupting a higher network layer session.

The base station 170 contains the matching CDMA 241 and EW[x] 242 protocols as well as bandwidth management 243. On the PSTN side, the protocols may convert back to basic rate interface 244 and LAPD 245 or may also include higher level network layer protocols as Q.931 or V5.2 246.

Call processing functionality 247 allows the network layer to set up and tear down channels and provide other processing required to support end to end session connections between nodes as is known in the art.

The spoofing function 132 performed by the EW[x] protocol 234 includes the necessary functions to keep the U interface for the ISDN connection properly maintained, even in the absence of a CDMA radio link 160 being available. This is necessary because ISDN, being a protocol originally developed for wire line connections, expects to send a continuous stream of synchronous data bits regardless of whether the terminal equipment at either end actually has any data to transmit. Without the spoofing function 132, radio links 160 of sufficient bandwidth to support at least a 192 kbps data rate would be required throughout the duration of an end to end network layer session, whether or not data is actually presented.

EW[x] 234 therefore involves having the CDMA transceiver 140 loop back these synchronous data bits over the ISDN communication path to spoof the terminal equipment 110, 112 into believing that a sufficiently wide wireless communication link 160 is continuously available. However, only when there is actually data present from the terminal equipment to the wireless transceiver 140 is wireless bandwidth allocated. Therefore, unlike the prior art, the network layer need not allocate the assigned wireless bandwidth for the entirety of the communications session. That is, when data is not being presented upon the terminal equipment to the network equipment, the bandwidth management function 235 deallocates initially assigned radio channel bandwidth 160 and makes it available for another transceiver and another subscriber unit 101.

Figure 3:
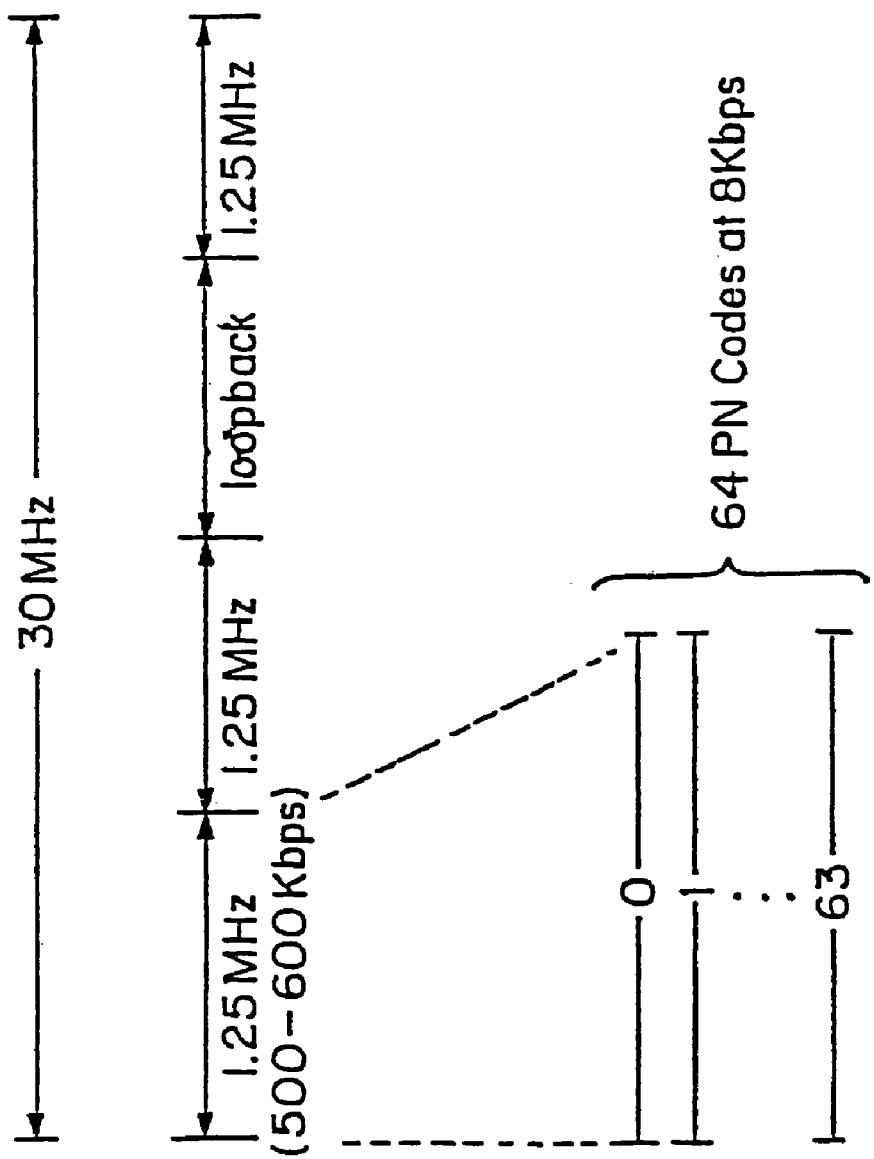
FIG. 3 is a diagram showing how subchannels are assigned within a given radio frequency (RF) channel.

In order to better understand how bandwidth management 235 and 243 accomplish the dynamic allocation of radio bandwidth, turn attention now to FIG. 3. This figure illustrates one possible frequency plan for the wireless links 160 according to the invention. In particular, a typical transceiver 170 can be tuned on command to any 1.25 MHZ channel within a much larger bandwidth, such as up to 30 MHZ. In the case of location in an existing cellular radio frequency bands, these bandwidths are typically made available in the range of from 800 to 900 MHZ. For personal communication systems (PCS) type wireless systems, the bandwidth is typically allocated in the range from about 1.8 to 2.0 GigaHertz (GHz). In addition, there are typically two matching bands active simultaneously, separated by a guard band, such as 80 MHZ; the two matching bands form forward and reverse full duplex link.

Each of the CDMA transceivers, such as transceiver 140 in the subscriber unit 101 and transceivers 172 in the base station 170, are capable of being tuned at any given point in time to a given 1.25 MHZ radio frequency channel. It is generally understood that such 1.25 MHZ radio frequency carrier provides, at best, a total equivalent of about 500 to 600 kbps maximum data rate transmission within acceptable bit error rate limitations.

In the prior art, it was thus generally understood that in order to support an ISDN type like connection which may contain information at a rate of 128 kbps that, at best, only about (500 kbps/128 kbps) or only 3 ISDN subscriber units could be supported at best.

In contrast to this, the present invention subdivides the available approximately 500 to 600 kbps bandwidth into a relatively large number of subchannels. In the illustrated example, the bandwidth is divided into 64 subchannels 300, each providing an 8 kbps data rate. A given subchannel 300 is physically implemented by encoding a transmission with one of a number of different assignable pseudorandom codes. For example, the 64 subchannels 300 may be defined within a single CDMA RF carrier by using a different orthogonal Walsh codes for each defined subchannel 300.

The basic idea behind the invention is to allocate the subchannels 300 only as needed. For example, multiple subchannels 300 are granted during times when a particular ISDN subscriber unit 101 is requesting that large amounts of data be transferred. These subchannels 300 are released during times when the subscriber unit 101 is relatively lightly loaded.

Figure 4:
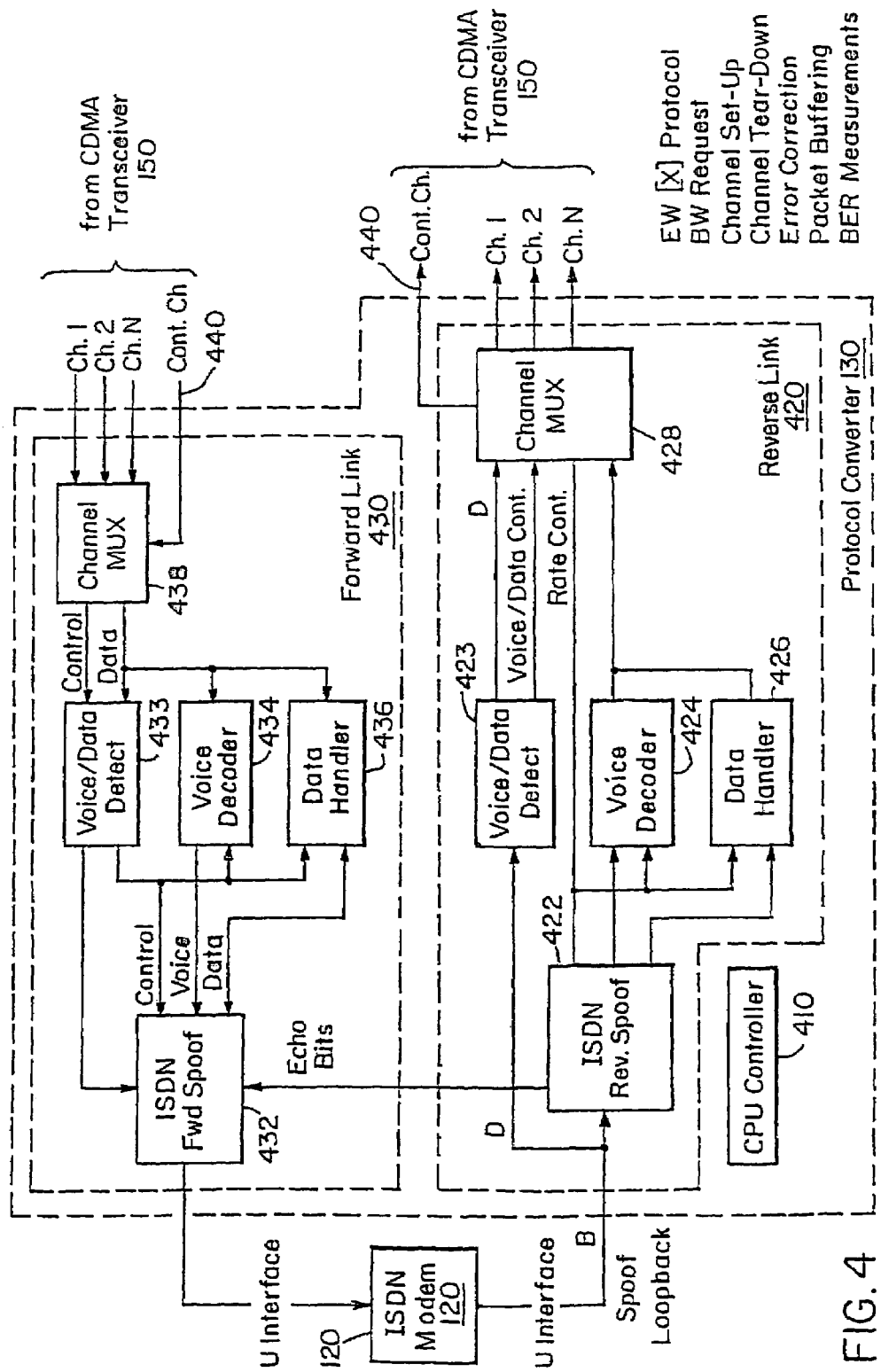
FIG. 4 is a more detailed block diagram of the elements of a subscriber unit.

Before discussing how the subchannels are preferably allocated and deallocated, it will help to understand a typical subscriber unit 101 in greater detail. Turning attention now to FIG. 4, it can be seen that an exemplary protocol converter 130 consists of a microcontroller 410, reverse link processing 420, and forward link processing 430. The reverse link processing 420 further includes ISDN reverse spoofer 422, voice data detector 423, voice decoder 424, data handler 426, and channel multiplexer 428. The forward link processing 430 contains analogous functions operating in the reverse direction, including a channel multiplexer 438, voice data detector 433, voice decoder 434, data handler 436, and ISDN forward spoofer 432.

In operation, the reverse link 420 first accepts channel data from the ISDN modem 120 over the U interface and forwards it to the ISDN reverse spoofer 432. Any repeating, redundant "echo" bits are removed from data received and once extracted, sent to the forward spoofer 432. The remaining layer three and higher level bits are thus information that needs to be send over a wireless link.

This extracted data is sent to the voice decoder 424 or data handler 426, depending upon the type of data being processed.

Any D channel data from the ISDN modem 120 is sent directly to voice data detection 423 for insertion on the D channel inputs to the channel multiplexer 428. The voice data detection circuit 423 determines the content of the D channels by analyzing commands received on the D channel.

D channel commands may also be interpreted to control a class of wireless services provided. For example, the controller 410 may store a customer parameter table that contains information about the customers desired class of service which may include parameters such as maximum data rate and the like. Appropriate commands are thus sent to the channel multiplexer 428 to request one or more required subchannels 300 over the radio links 160 for communication. Then, depending upon whether the information is voice or data, either the voice decoder 424 or data handler 426 begins feeding data inputs to the channel multiplexer 428.

The channel multiplexer 428 may make further use of control signals provided by the voice data detection circuits 423, depending upon whether the information is voice or data.

In addition, the CPU controller 410, operating in connection with the channel multiplexer 428, assists in providing the necessary implementation of the EW[x] protocol 234 between the subscriber unit 101 and the base station 170. For example, subchannel requests; channel setup, and channel tear down commands are sent via commands placed on the wireless control channel 440. These commands are intercepted by the equivalent functionality in the base station 170 to cause the proper allocation of subchannels 300 to particular network layer sessions.

The data handler 426 provides an estimate of the data rate required to the CPU controller 410 so that appropriate commands can be sent over the control channel 440 to allocate an appropriate number of subchannels. The data handler 426 may also perform packet assembly and buffering of the layer three data into the appropriate format for transmission.

The forward link 430 operates in analogous fashion. In particular, signals are first received from the channels 160 by the channel multiplexer 438. In response to receiving information on the control channels 440, control information is routed to the voice data detection circuit 433. Upon a determination that the received information contains data, the received bits are routed to the data handler 436. Alternatively, the information is voice information, and routed to the voice decoder 434.

Voice and data information are then sent to the ISDN forward spoofer 432 for construction into proper ISDN protocol format. This assembly of information is coordinated with the receipt of echo bits from the ISDN reverse spoofer 422 to maintain the proper expected synchronization on the U interface with the ISDN modem 120.

It can now be seen how a network layer communication session may be maintained even though wireless bandwidth initially allocated for transmission is reassigned to other uses when there is no information to transmit. In particular, the reverse 422 and forward 432 spoofers cooperate to loop back non-information bearing signals, such as flag patterns, sync bits, and other necessary information, so as to spoof the data terminal equipment connected to the ISDN modem 120 into continuing to operate as though the allocated wireless path over the CDMA transceiver 150 is continuously available.

Therefore, unless there is an actual need to transmit information from the terminal equipment being presented to the channel multiplexers 428, or actual information being received from the channel multiplexers 438, the invention may deallocate initially assigned subchannel 300, thus making them available for another subscriber unit 101 of the wireless system 100.

The CPU controller 410 may also perform additional functions to implement the EW[x] protocol 234, including error correction, packet buffering, and bit error rate measurement.

The functions necessary to implement bandwidth management 235 in the subscriber unit 101 are carried out in connection with the EW[x] protocol typically by the CPU controller 410 operating in cooperation with the channel multiplexers 428, 438, and data handlers 420, 436. In general, bandwidth assignments are made for each network layer session base& upon measured short term data rate needs. One or more subchannels 300 are then assigned based upon these measurements and other parameters such as amount of data in queue or priority of service as assigned by the service provider. In addition, when a given session is idle, a connection is preferably still maintained end to end, although with a minimum number of, such as a single subchannel being assigned. For example, this single subchannel may eventually be dropped after a predetermined minimum idle time is observed.

Figure 5:
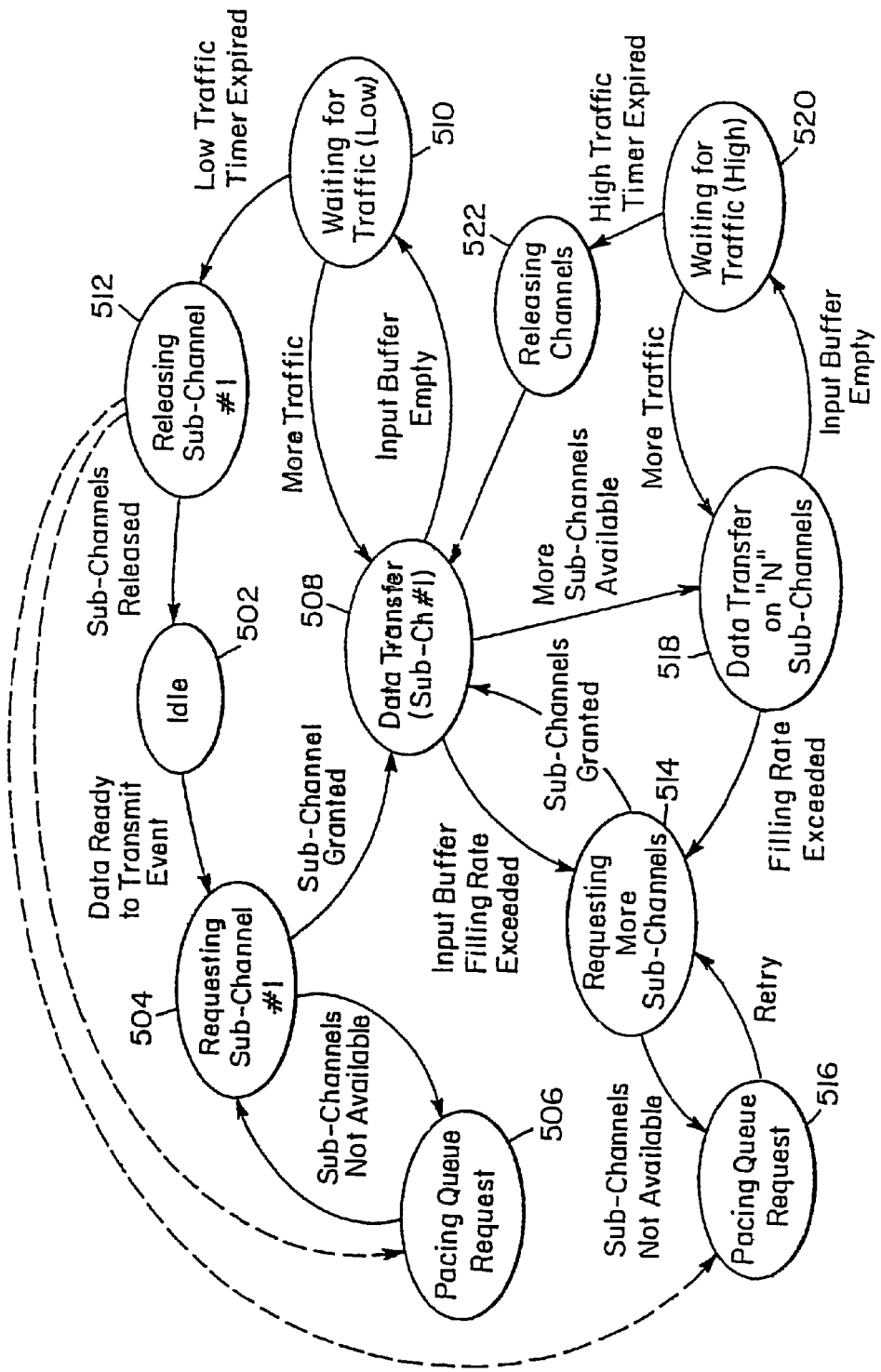
FIG. 5 is a state diagram of the operations performed by a subscriber unit to request and release subchannels dynamically.

FIG. 5 is a detailed view of the process by which a subscriber unit 101 may request subchannel 300 allocations from the base station 170 according to the invention. In a first state 502, the process is in an idle state. At some point, the process becomes ready to transmit and state 504 is entered, where the fact that data is ready to be transmitted may be detected by an input data buffer in the data handler 426 indicated that there is data ready.

In state 504, a request is made, such as via a control channel 440 for the allocation of a subchannel to subscriber unit 101. If a subchannel is not immediately available, a pacing state 506 may be entered in which the subscriber unit simply waits and queues its request for a subchannel to be assigned.

Eventually, a subchannel 300 is granted by the base station and the process continues to state 508. In this state, data transfer may then begin using the single assigned subchannel. The process will continue in this state as long as the single subchannel 300 is sufficient for maintaining the required data transfer and/or is being utilized. However, if the input buffer should become empty, such as notified by the data handler 426, then the process will proceed to a state 510. In this state 510, the subchannel will remain assigned in the event that data traffic again resumes. In this case, such as when the input buffer begins to once again become full and data is again ready to transmit, then the process returns to state 508. However, from state 510 should a low traffic timer expire, then the process proceeds to state 512 in which the single subchannel 300 is released. The process then returns to the idle state 502. In state 512, if a queue request is pending from states 506 or 516, the subchannel is used to satisfy such request instead of releasing it.

Returning to state 508, if instead the contents of the input buffer are beginning to fill at a rate which exceeds a predetermined threshold indicating that the single subchannel 300 is insufficient to maintain the necessary data flow, then a state 514 is entered in which more subchannels 300 are requested. A subchannel request message is again sent over the control channel 440 or through a subchannel 300 already allocated. If additional subchannels 300 are not immediately available, then a pacing state 516 may be entered and the request may be retried by returning to state 514 and 516 as required. Eventually, an additional subchannel will be granted and processing can return to state 508.

With the additional subchannels being now available, the processing continues to state 518 where data transfer may be made on a multiple N of the subchannels. This may be done at the same time through a channel bonding function or other mechanism for allocating the incoming data among the N subchannels. As the input buffer contents reduced below an empty threshold, then a waiting state 520 may be entered.

If, however, a buffer filling rate is exceeded, then state 514 may be entered in which more subchannels 300 are again requested.

In state 520, if a high traffic timer has expired, then one or more of the additional subchannels are released in state 522 and the process returns to state 508.

Figure 6:
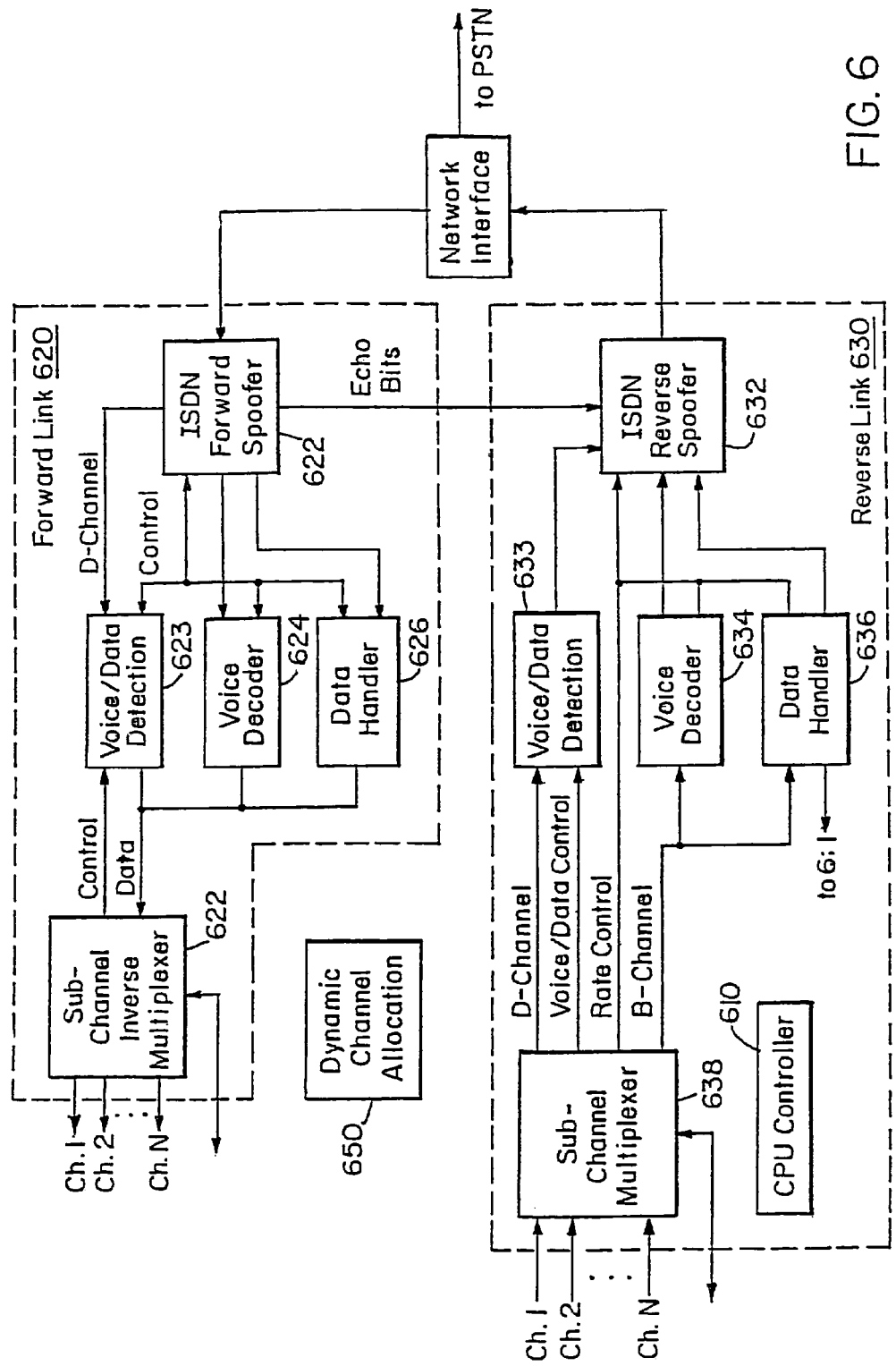
FIG. 6 is a block diagram of a portion of a base station unit necessary to service each subscriber unit.

FIG. 6 is a block diagram of the components of the base station equipment 170 of the system 100. These components perform analogous functions to those as already described in detail in FIG. 4 for the subscriber unit 101. It should be understood that a forward link 620 and reverse link 630 are required for each subscriber unit 101 or 102 needing to be supported by the base station 170.

The base station forward link 620 functions analogously to the reverse link 420 in the subscriber unit 100, including a subchannel inverse multiplexer 622, voice data detection 623, voice decoder 624, data handler 626, and ISDN spoofer 622, with the understanding that the data is traveling in the opposite direction in the base station 170. Similarly, the base station reverse link 630 includes components analogous to those in the subscriber forward link 430, including an ISDN spoofer 632, voice data detection 633, voice decoder 634, data handler 636, and subchannel multiplexer 638. The base station 170 also requires a CPU controller 610.

One difference between the operation of the base station 170 and the subscriber unit 101 is in the implementation of the bandwidth management functionality 243. This may be implemented in the CPU controller 610 or in another process in the base station 170.

A high level description of a software process performed by dynamic channel allocation portion 650 of the bandwidth management 243 is contained in FIG. 7. This process includes a main program 710, which is continuously executed, and includes processing port requests, processing bandwidth release, and processing bandwidth requests, and then locating and tearing down unused subchannels.

The processing of port requests is more particularly detailed in a code module 720. These include upon receiving a port request, and reserving a subchannel for the new connection, preferably chosen from the least utilized section of the radio frequency bandwidth. Once the reservation is made, an RF channel frequency and code assignment are returned to the subscriber unit 101 and a table of subchannel allocations is updated. Otherwise, if subchannels are not available, then the port request is added to a queue of port requests. An expected waiting time may be estimated upon the number of pending port requests and priorities, and an appropriate wait message can be returned to the requesting subscriber unit 101.

In a bandwidth release module 730, the channel bonding function executing in the multiplexer 622 in the forward link is notified of the need to release a subchannel. The frequency and code are then returned to an available pool of subchannels and a radio record is updated.

The following bandwidth request module 740 may include selecting the request having the highest priority with lowest bandwidth utilization. Next, a list of available is subchannels is analyzed for determining the greatest available number. Finally, subchannels are assigned based upon need, priority, and availability. A channel bandwidth bonding function is notified within the subchannel multiplexer 622 and the radio record which maintains which subchannels are assigned to which connections is updated.

In the bandwidth on demand algorithm, probability theory may typically be employed to manage the number of connections or available ports, and the spectrum needed to maintain expected throughput size and frequency of subchannel assignments. There may also be provisions for priority service based upon subscribers who have paid a premium for their service.

It should be understood, for example, that in the case of a supporting 128 kbps ISDN subscriber unit 101 that even more than 16×8 kbps subchannels may be allocated at a given time. In particular, one may allow a larger number, such as 20 subchannels, to be allocated to compensate for delay and reaction in assigning subchannels. This also permits dealing with bursts of data in a more efficient fashion such as typically experienced during the downloading of Web pages.

In addition, voice traffic may be prioritized as against data traffic. For example, if a voice call is detected, at least one subchannel 300 may be active at all times and allocated exclusively to the voice transfer. In that way, voice calls blocking probability will be minimized.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, instead of ISDN, other wireline digital protocols may be encapsulated by the EW[x] protocol, such as xDSL, Ethernet, and X.25, and therefore may advantageously use the dynamic wireless subchannel assignment scheme described herein.

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A code division multiple access (CDMA) user device comprising:
    a CDMA transceiver; and
    a controller operably connected to the CDMA transceiver to establish a packet data communication session with a network in accordance with a protocol architecture, the protocol architecture having a plurality of protocol layers including a physical layer,
    wherein the controller is further operable with the CDMA transceiver to facilitate use by the CDMA transceiver of a plurality of data traffic channels and a control channel associated with the packet data communication session,
    the control channel carrying information indicative of a data rate associated with the data traffic channels, wherein the control channel is not adapted to carry voice or data traffic, and
    wherein a state of at least one of the plurality of protocol layers above the physical layer is maintained during the packet data communication session after the data traffic channel have been released.

2. A CDMA user device according to claim 1, wherein the control channel is transmitted to a base station in the network.

3. A CDMA user device according to claim 1, wherein the CDMA transceiver is operable to simultaneously transmit the data traffic channels and the control channel to a base station in the network.

4. A CDMA user device according to claim 1, wherein the data traffic channels carry voice information to a base station in the network.

5. A CDMA user device according to claim 1, further comprising a channel multiplexer for multiplexing data traffic and control channels.

6. A CDMA user device according to claim 1, wherein the data traffic channels and control channel are encoded with corresponding spreading codes.

7. A CDMA user device according to claim 1, wherein the data rate varies over time.

8. A CDMA user device according to claim 1, wherein the data traffic channels and the control channel operate within a 1.25 MHz bandwidth.

9. The CDMA user device of claim 1, wherein the CDMA user device is a portable device comprising an integrated unit having a modem, the CDMA transceiver and the controller.

10. The CDMA user device of claim 9, wherein the portable device comprises terminal equipment.

11. The CDMA user device of claim 1, wherein the plurality of protocol layers includes an application layer.

12. The CDMA user device of claim 1, wherein the user device is operable to run an internet application.

13. The CDMA user device of claim 1, wherein the user device is operable to download a web page.

14. The CDMA user device of claim 1, wherein the CDMA transceiver is operable by the controller to transmit first CDMA signals on a transmission frequency, the transmission frequency being selected by the controller from a plurality of transmission frequencies, the CDMA transceiver also being operable by the controller to receive second CDMA signals on a reception frequency, the reception frequency being selected by the controller from a plurality of reception frequencies.

15. The CDMA user device of claim 1, further comprising a memory configured to store class of service information, wherein the controller is operable to retrieve the class of service information stored in the memory.

16. The CDMA user device of claim 1, further comprising a memory configured to store information related to a maximum data rate associated with the user device, wherein the controller is operable to retrieve the maximum data rate associated with the user device from the memory.

17. The CDMA user device of claim 1, wherein the controller is operable to assemble and buffer packet data for transmission over the data traffic channels.

18. The CDMA user device of claim 1, wherein the controller is operable to request the data traffic channels based on a priority of service of the packet data.

19. The CDMA user device of claim 1, wherein the controller is operable to request the data traffic channels further based on an estimated data rate selected to transmit the packet data.

20. A code division multiple access (CDMA) user device comprising:
    a CDMA transceiver;
    a controller operable with the CDMA transceiver to establish a packet data communication session with a network in accordance with a protocol architecture, the protocol architecture having a plurality of protocol layers including a physical layer,
    the controller being operable with the CDMA transceiver to facilitate use of a data traffic channel and a control channel by the CDMA user device during the packet data communication session, wherein the data traffic channel and control channel are associated with corresponding CDMA codes and the control channel carries information indicative of a data rate associated with the data traffic channel, wherein the control channel is not adapted to carry voice or data traffic;
    wherein a state of at least one of the protocol layers other than the physical layer is maintained during the packet data communication session after the data traffic channel has been released, and
    wherein the controller is operable to request the data traffic channel based on an amount of packet data in a packet data queue.

21. A CDMA user device according to claim 20, wherein the control channel is supplied to a base station in the network.

22. A CDMA user device according to claim 20, wherein the data traffic channel carries voice information and is supplied to a base station in the network.

23. A CDMA user device according to claim 20, wherein the CDMA transceiver is operable to simultaneously transmit the control and data traffic channels to a base station in the network.

24. A CDMA user device according to claim 20, further comprising a channel multiplexer for multiplexing control and data traffic channels.

25. A CDMA user device according to claim 20, wherein the control and data traffic channels are encoded with corresponding Walsh codes.

26. A CDMA user device according to claim 20, wherein the data traffic channel and the control channel operate within a 1.25 MHz bandwidth.

27. The CDMA user device of claim 20, wherein the user device is a portable device comprising an integrated unit having a modem, the CDMA transceiver and the controller.

28. The CDMA user device of claim 20, wherein the plurality of protocol layers includes an application layer.

29. The CDMA user device of claim 20, wherein the user device is operable to run an internet application.

30. The CDMA user device of claim 20, wherein the user device is operable to download a web page.

31. The CDMA user device of claim 20, wherein the CDMA transceiver is operable by the controller to transmit first CDMA signals on a transmission frequency, the transmission frequency being selected by the controller from a plurality of transmission frequencies, the CDMA transceiver also being operable by the controller to receive second CDMA signals on a reception frequency, the reception frequency being selected by the controller from a plurality of reception frequencies.

32. The CDMA user device of claim 20, wherein the CDMA user device further includes a memory, the memory being configured to store class of service information, the controller being configured to retrieve the class of service information stored in the memory.

33. The CDMA user device of claim 20, wherein the CDMA user device further includes a memory, the memory being configured to store maximum data rate information associated with the user device, the controller being operable to retrieve the stored maximum data rate information associated with the user device from the memory.

34. The CDMA user device of claim 20, wherein the controller is operable to assemble and buffer the packet data for transmission over the data traffic channel.

35. The CDMA user device of claim 20, wherein the controller is operable to request the data traffic channel further based on a priority of service of the packet data.

36. The CDMA user device of claim 20, wherein the controller is operable to request the data traffic channel further based on an estimated data rate selected to transmit the packet data.

37. The CDMA user device of claim 20, wherein the controller is operable to request the data traffic channel independent of an existing forward channel allocation.

38. A code division multiple access (CDMA) user device comprising:

a controller;

a CDMA transceiver operably connected to the controller, the CDMA transceiver being operable to transmit packet data over a data traffic channel associated with a packet data communication session, the CDMA transceiver also being operable to transmit a control channel carrying information indicative of a data rate associated with the data traffic channel, such that the control channel is not adapted to carry voice or data traffic, wherein each of the data traffic and control channels is associated with a corresponding CDMA code wherein a plurality of protocol layers, including a physical layer, is associated with the packet data communication session, and a status of at least one of the plurality of protocol layers other than the physical layer is maintained upon release of the data traffic channel, and wherein the controller is operable to request the data traffic channel based on an amount of packet data in a packet data queue.

39. A CDMA user device according to claim 38, further comprising a data buffer coupled to the controller.

40. A CDMA user device according to claim 39, further comprising a monitor to detect a rate at which the data buffer is filled.

41. The CDMA user device of claim 38, wherein the controller is operable to request the data traffic channel independent of an existing forward channel allocation.

42. The CDMA user device of claim 41, wherein the portable device comprises terminal equipment.

43. The CDMA user device of claim 38, wherein the user device is a portable device comprising an integrated unit having a modem, the CDMA transceiver and the controller.

44. The CDMA user device of claim 43, wherein the portable device comprises terminal equipment.

45. The CDMA user device of claim 38, wherein one of the plurality of protocol layers comprises an application layer.

46. The CDMA user device of claim 38, wherein the user device is operable to run an internet application.

47. The CDMA user device of claim 38, wherein the user device is operable to download a web page.

48. The CDMA user device of claim 38, wherein the CDMA transceiver is operable by the controller to transmit first CDMA signals on a transmission frequency, the transmission frequency being selected by the controller from a plurality of transmission frequencies, the CDMA transceiver also being operable by the controller to receive second CDMA signals on a reception frequency, the reception frequency being selected by the controller from a plurality of reception frequencies.

49. The CDMA user device of claim 38, wherein the CDMA user device includes a memory, the memory storing class of service information, the controller being operable to retrieve the class of service information from the memory.

50. The CDMA user device of claim 38, wherein the CDMA user device includes a memory, the memory storing maximum data rate information associated with the CDMA user device, the controller being operable to retrieve the maximum data rate information from the memory.

51. The CDMA user device of claim 38, wherein the controller is operable to assemble and buffer packet data for transmission over the data traffic channel.

52. The CDMA user device of claim 38, wherein the controller is operable to request the data traffic channel further based on a priority of service of the packet data.

53. The CDMA user device of claim 38, wherein the controller is operable to request the data traffic channel further based on an estimated data rate selected to transmit the packet data.

54. The CDMA user device of claim 38, wherein the controller requests the data traffic channel independent of an existing forward channel allocation.

55. A CDMA user device according to claim 38, wherein the data traffic channel and the control channel operate within a 1.25 MHz bandwidth.

56. A code division multiple access (CDMA) user device comprising:

a CDMA transceiver; and a controller operable with the CDMA transceiver such that the CDMA transceiver is operable to transmit packet data over a reverse data traffic channel and receive data over a plurality of forward traffic channels during a packet data communication session between the user device and a network, the packet data communication session including a first time period during which first packet data is transmitted or received by the user device, a second time period after the first time period during which the forward and reverse data traffic channels are released, and a third time period after the second time period during which second packet data is transmitted or received by the user device, wherein each of the forward and reverse traffic channels is associated with a corresponding CDMA code, wherein the controller is further operable with the CDMA transceiver to facilitate use by the CDMA transceiver of a control channel associated with the packet data communication session, the control channel carrying information indicative of a data rate associated with the reverse data traffic channel, wherein the control channel is not adapted to carry voice or data traffic, and wherein the controller is also operable with the CDMA transceiver to establish the packet data communication session with the network in accordance with a protocol architecture, the protocol architecture having a plurality of protocol layers including a physical layer, such that a state of at least one of the plurality of protocol layers other than the physical layer is maintained during the second time period.

57. The CDMIA user device of claim 56, wherein the second period of time includes a predetermined period of time of packet data inactivity between the user device and the base station in the network over the data traffic channel, wherein the forward and reverse data traffic channels are released upon expiration of the predetermined period of time.

58. The CDMA user device of claim 56, wherein the user device is a portable device comprising an integrated unit having a modem, the CDMA transceiver and the controller.

59. The CDMA user device of claim 58, wherein the portable device comprises terminal equipment.

60. The CDMA user device of claim 56, wherein said one of the plurality of protocol layers includes an application layer.

61. The CDMA user device of claim 56, wherein the user device is operable to run an internet application.

62. The CDMA user device of claim 56, wherein the user device is operable to download a web page.

63. The CDMA user device of claim 56, wherein the CDMA transceiver is operable by the controller to transmit first CDMA signals on a transmission frequency, the transmission frequency being selected by the controller from a plurality of transmission frequencies, the CDMA transceiver also being operable by the controller to receive second CDMA signals on a reception frequency, the reception frequency being selected by the controller from a plurality of reception frequencies.

64. The CDMA user device of claim 56, wherein the CDMA user device includes a memory, the memory storing class of service information, the controller being operable to retrieve the class of service information from the memory.

65. The CDMA user device of claim 56, wherein the CDMA user device includes a memory, the memory storing maximum data rate information associated with the CDMA user device, the controller being operable to retrieve the maximum data rate information from the memory.

66. The CDMA user device of claim 56, wherein the controller is operable to assemble and buffer packet data for transmission over the reverse data traffic channel.

67. A CDMA user device according to claim 56, wherein the data traffic channel and the control channel operate within a 1.25 MHz bandwidth.

68. A code division multiple access (CDMA) base station:
a CDMA transceiver; and
a controller operably connected to the CDMA transceiver to establish a packet data communication session with a CDMA user device in accordance with a protocol architecture, the protocol architecture having a plurality of protocol layers including a physical layer, wherein the controller is further operable with the CDMA transceiver to facilitate use by the CDMA transceiver of a plurality of data traffic channels and a control channel output by the user device and associated with the packet data communication session, the control channel carrying information indicative of a data rate associated with the data traffic channels, wherein the control channel is not adapted to carry voice or data traffic, wherein a state of one of the plurality of protocol layers above the physical layer is maintained during the packet data communication session after the data traffic channels have been released, and wherein the controller is further operable with the CDMA transceiver to allocate the data traffic channels in response to a request received from the user device.

69. A CDMA base station according to claim 68, wherein the data traffic channels and the control channel operate within a 1.25 MHz bandwidth.

70. A code division multiple access (CDMA) base station comprising:
a CDMA transceiver; and
a controller operable with the CDMA transceiver such that the CDMA transceiver is operable to receive packet data over a plurality of reverse data traffic channels and transmit data over at least one forward traffic channel during a packet data communication session between a user device and a network including the CDMA base station, the packet data communication session including a first time period during which first packet data is transmitted or received by the user device, a second time period after the first time period during which the forward and reverse data traffic channels are released, and a third time period after the second time period during which second packet data is transmitted or received by the user device, wherein each of the forward and reverse traffic channels is associated with a corresponding CDMA code, wherein the controller is further operable with the CDMA transceiver to facilitate reception by the CDMA transceiver of a control channel output by the user device and associated with the packet data communication session, the control channel carrying information indicative of a data rate associated with the reverse data traffic channels, wherein the control channel is not adapted to carry voice or data traffic, wherein the controller is operably connected to the CDMA transceiver to establish the packet data communication session with the network in accordance with a protocol architecture, the protocol architecture having a plurality of protocol layers including a physical layer, such that a state of at least one of the plurality of protocol layers other than the physical layer is maintained during the second time period, and wherein the controller is further operable with the CDMA transceiver to allocate the reverse data traffic channels in response to a request received from the user device.

71. A CDMA base station according to claim 70, wherein the data traffic channel and the control channel operate within a 1.25 MHz bandwidth.

* * * * *

UNITED STATES PATENT AND TRADEMARK OFFICE
CERTIFICATE OF CORRECTION

PATENT NO. : 7,580,715 B2  Page 1 of 1
APPLICATION NO. : 10/776558
DATED : August 25, 2009
INVENTOR(S) : Gorsuch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 355 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,580,715 B2
APPLICATION NO. : 10/776558
DATED : August 25, 2009
INVENTOR(S) : Gorsuch et al.

It is certified that error appears in the above-identified patent and that said Letters Patent is hereby corrected as shown below:

ON THE TITLE PAGE

Item (56), U.S. PATENT DOCUMENTS, page 2, right column, after "6,001,800 A 12/1999", delete "Mehla" and insert --Mehta--.

Item (56), OTHER PUBLICATIONS, page 3, left column, after "no month", delete "liste" and insert --listed--.

Item (56), OTHER PUBLICATIONS, page 3, left column, after "Draft Text for" delete ""★95C"" and insert --"*95C"--.

Item (56), OTHER PUBLICATIONS, page 3, right column, after "USA, Nov. 3-8,", delete "1007" and insert --1997--.

Item (56), OTHER PUBLICATIONS, page 3, right column, after "Networks, Jun. 18,", delete "1005." and insert --1995.--.

Item (56), OTHER PUBLICATIONS, page 4, right column, after "USA, Nov. 3-8,", delete "1007", and insert --1997--.

Item (56), OTHER PUBLICATIONS, page 4, right column, after "Networks, Jun. 18,", delete "1005." and insert --1995.--.

Item (56), OTHER PUBLICATIONS, page 5, left column, after "Draft Text for", delete ""9 5C"", and insert --"*95C"--.

Item (56), OTHER PUBLICATIONS, page 5, left column, after "USA, Nov. 3-8,", delete "1007", and insert --1997--.

Item (56), OTHER PUBLICATIONS, page 6, left column, after "Networks, Jun. 18,", delete "1005." and insert --1995.--.

Item (56), OTHER PUBLICATIONS, page 6, right column, after "USA, Nov. 3-8,", delete "1007", Signed and Sealed this
Seventeenth Day of July, 2012

David J. Kappos
*Director of the United States Patent and Trademark Office*

CERTIFICATE OF CORRECTION (continued)
U.S. Pat. No. 7,580,715 B2 and insert --1997--.

Item (56), OTHER PUBLICATIONS, page 7, left column, after "Networks, Jun. 18,", delete "1005." and insert --1995.--.

Item (56), OTHER PUBLICATIONS, page 8, left column, after "USA, Nov. 3-8,", delete "1007" and insert --1997--.

Item (56), OTHER PUBLICATIONS, page 8, left column, after "Networks, Jun. 18,", delete "1005." and insert --1995.--.

Item (56), OTHER PUBLICATIONS, page 9, right column, after "Networks, Jun. 18,", delete "1005." and insert --1995.--.

At column 2, line 63, before the words "a plurality" delete "comprises" and insert therefor --comprise--.

At column 4, line 48, before the word "format" delete "to" and insert therefor --into a--.

At column 4, line 57, after the word "that" insert --it--.

At column 4, line 67, after the word "data" delete "in" and insert therefor --into--.

At column 5, line 21, after the word "signals" insert --which--.

At column 5, line 24, after the word "subscriber" delete "units-such-as" and insert therefor --units such as--.

At column 6, line 54, after the word "frequency" delete "bands" and insert therefor --band--.

At column 7, line 5, after the word "type" delete "like".

At column 7, line 18, after the word "Walsh" delete "codes" and insert therefor --code--.

At column 8, line 58, after the word "session" delete "base&" and insert therefor --based--.

At column 9, line 49, after the word "contents" insert --is--.

At column 10, line 40, after the word "available" delete "is".

At claim 57, column 15, line 23, before the word "user" delete "CDMIA" and insert therefor --CDMA--.